United States Patent
Davne et al.

(10) Patent No.: US 8,910,278 B2
(45) Date of Patent: Dec. 9, 2014

(54) MANAGING SERVICES IN A CLOUD COMPUTING ENVIRONMENT

(75) Inventors: Joel Davne, Collegeville, PA (US); Andrii Volkov, North Brunswick, NJ (US); Max Yankelevich, Monroe Township, NJ (US); Mikhail Malamud, Huntington Valley, PA (US)

(73) Assignee: CloudNexa, Conshohocken, PA (US)

( * ) Notice: Subject to any disclaimer, the term of this patent is extended or adjusted under 35 U.S.C. 154(b) by 317 days.

(21) Appl. No.: 13/110,595

(22) Filed: May 18, 2011
(Under 37 CFR 1.47)

(65) Prior Publication Data
US 2012/0072985 A1    Mar. 22, 2012

Related U.S. Application Data

(60) Provisional application No. 61/345,935, filed on May 18, 2010.

(51) Int. Cl.
*H04L 29/06* (2006.01)
*H04L 29/08* (2006.01)

(52) U.S. Cl.
CPC ............ *H04L 63/20* (2013.01); *H04L 63/0272* (2013.01); *H04L 67/02* (2013.01); *H04L 67/10* (2013.01)
USPC .......... 726/22; 726/1; 726/15; 726/27; 705/2; 705/7.27; 705/51; 709/223

(58) Field of Classification Search
USPC ....................................................... 726/1, 22
See application file for complete search history.

(56) References Cited

U.S. PATENT DOCUMENTS

| | | | | |
|---|---|---|---|---|
| 2002/0147801 | A1* | 10/2002 | Gullotta et al. | 709/223 |
| 2008/0240128 | A1* | 10/2008 | Elrod | 370/401 |
| 2008/0244579 | A1* | 10/2008 | Muller | 718/100 |
| 2010/0042720 | A1* | 2/2010 | Stienhans et al. | 709/226 |
| 2010/0318642 | A1* | 12/2010 | Dozier | 709/223 |
| 2011/0022642 | A1* | 1/2011 | Demilo et al. | 707/805 |
| 2011/0072487 | A1 | 3/2011 | Hadar et al. | |
| 2011/0214176 | A1* | 9/2011 | Burch et al. | 726/15 |
| 2012/0233678 | A1* | 9/2012 | Pal | 726/7 |
| 2012/0254433 | A1* | 10/2012 | Gujral et al. | 709/226 |

OTHER PUBLICATIONS

Ko et al., "TrustCloud: A Framework for Accountability and Trust in Cloud Computing", 2011, pp. 584-588.*

* cited by examiner

*Primary Examiner* — Taghi Arani
*Assistant Examiner* — Thaddeus Plecha
(74) *Attorney, Agent, or Firm* — Fleit Gibbons Gutman Bongini & Bianco PL; Jon A. Gibbons

(57) ABSTRACT

What is provided are a system and method which enables an organization or user to manage computational services in a cloud computing network for security, compliance and governance. The management including creating a trusted virtual network including encrypted data storage, encrypted data transport, and trusted instances of servers all communicatively coupled together forming a trusted cloud computing environment that is associated with the organization. A web portal running on a web server provides a point of access to the cloud computing environment. A workflow is accessed to implement one or more policies in trusted computing environment to manage the trusted cloud computing environment, the workflow customized to the organization. The access control; and to the trusted cloud computing environment is used to ensure access by users authorized by the organization to ensure compliance with adopted standards.

16 Claims, 19 Drawing Sheets

MANAGING SERVICES IN A CLOUD COMPUTING ENVIRONMENT

CROSS-REFERENCE TO RELATED APPLICATIONS

This non-provisional application is a continuation-in-part and claims priority from the provisional application entitled "VIRTUAL NETWORK OPERATION CENTER", Ser. No. 61/345,935, filed on May 18, 2011, and which is incorporated herein by reference in its entirety.

FIELD OF THE DISCLOSURE

The present disclosure generally relates to provisioning and managing computational services in a cloud computing network.

BACKGROUND

Cloud computing refers to the provision of computational resources on demand via a computer network. Because the cloud is an underlying delivery mechanism, cloud based applications and services may support any type of software application or service in use today.

Cloud computing fundamentally allows for a functional separation between the resources used and the user's computer. The computing resources may or may not reside outside the local network, for example in an internet connected datacenter. What is important to the individual user is that they simply work. This separation between the resources used and the user's computer also has allowed for the development of new business models. All of the development and maintenance tasks involved in provisioning the application are performed by the service provider. The user's computer may contain very little software or data (perhaps a minimal operating system and web browser only), serving as little more than a display terminal for processes occurring on a network of computers far away. Consumers now routinely use data intensive applications driven by cloud technology which were previously unavailable due to cost and deployment complexity.

A common shorthand for a provided cloud computing service (or even an aggregation of all existing cloud services) is "The Cloud". The most common analogy to explain cloud computing is that of public utilities such as electricity, gas, and water. Just as centralized and standardized utilities free individuals from the difficulties of generating electricity or pumping water, cloud computing frees users from certain hardware and software installation and maintenance tasks through the use of simpler hardware that accesses a vast network of computing resources (processors, hard drives, etc.). The sharing of resources reduces the cost to individuals.

Cloud computing utilizes the network as a means to connect user end point devices (end points) to resources that are centralized in a data center. The data center may be accessed via the internet or a company network, or both. In many cases a cloud service may allow access from a variety of end points such as a mobile phone, a PC or a tablet. Cloud services may be designed to be vendor independent, working equally well with Linux, Mac and PC platforms. They also can allow access from any internet connected location, allowing mobile workers to access business systems remotely as in telecommuting, and extending the reach of business services provided by outsourcing.

A user endpoint with minimal software requirements may submit a task for processing. The service provider may pool the processing power of multiple remote computers in "the cloud" to achieve the task, such as data warehousing of hundreds of terabytes, managing and synchronizing multiple documents, online or computationally intensive work. These tasks would normally be difficult, time consuming, or expensive for an individual user or a small company to accomplish. The outcome of the processing task is returned to the client over the network. In essence, the heavy lifting of a task is outsourced to an external entity with more resources and expertise.

The services—such as, email and data storage and processing—and software are provided by the company hosting the remote computers. The clients are only responsible for having a computer with a connection to the Internet, or a company network, in order to make requests to and receive data from the cloud. Computation and storage is divided among the remote computers in order to handle large volumes of both, thus the client need not purchase expensive hardware to handle the task.

BRIEF SUMMARY

Provided are a system, a computer program product and a method disclosed which enables an organization or user to manage computational services in a cloud computing network for security, compliance and governance. The management including creating a trusted virtual network including encrypted data storage, encrypted data transport, and trusted instances of servers all communicatively coupled together forming a trusted cloud computing environment that is associated with the organization. A web portal running on a web server provides a point of access to the cloud computing environment. A workflow is accessed to implement one or more policies in trusted computing environment to manage the trusted cloud computing environment, the workflow customized to the organization. The access control and the trusted cloud computing environment is used to ensure access by users authorized by the organization to ensure compliance with adopted standards.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
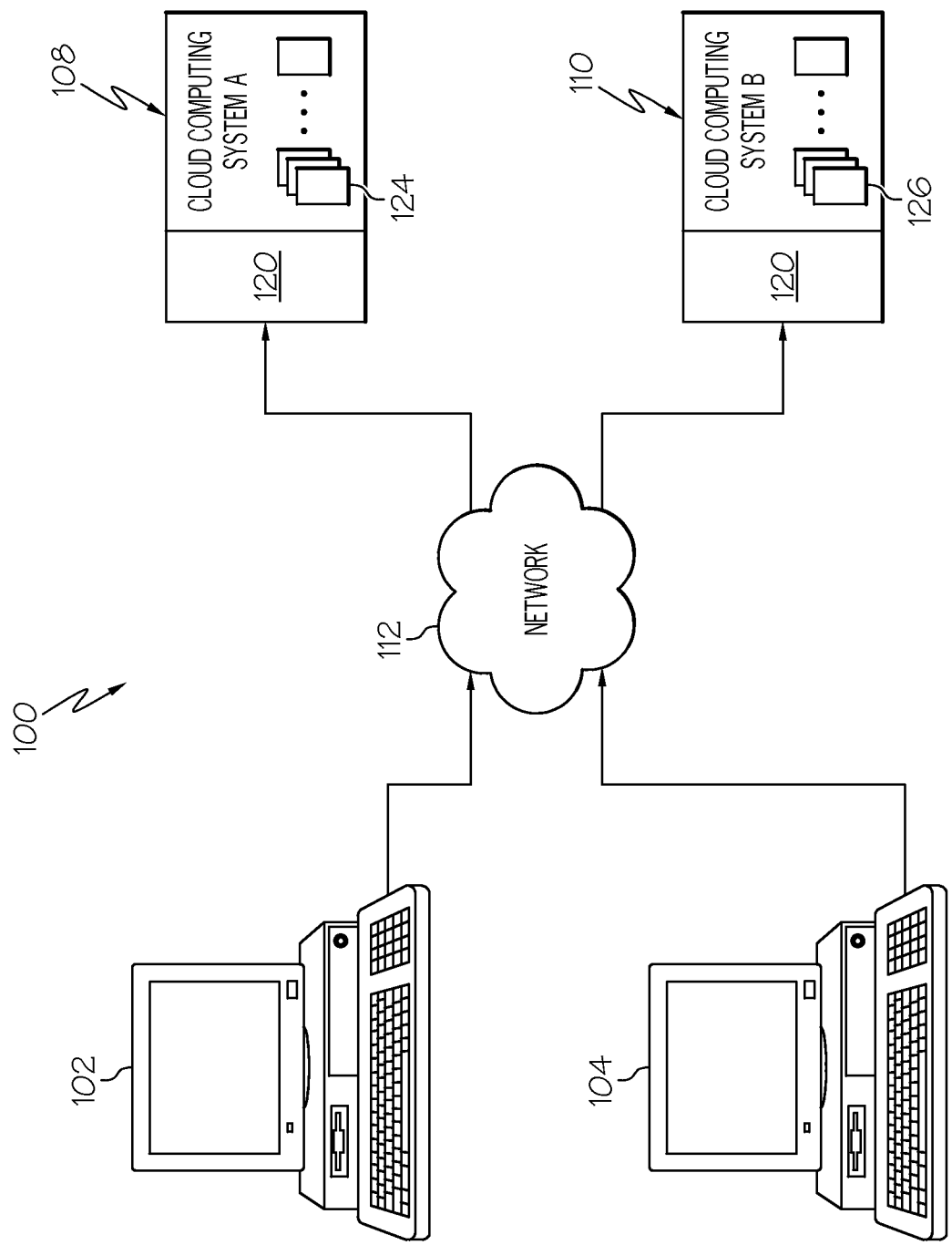
FIG. 1 illustrates an example client system coupled to a cloud computing environment.

As required, detailed embodiments are disclosed herein. However, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having" as used herein, are defined as comprising (i.e. open language). The term "coupled" as used herein, is defined as "connected" although not necessarily directly, and not necessarily mechanically. The term "trust" is defined to mean a combination, in whole or in part, of security, compliance, and governance regulations, which may be both internal to an organization and external to the organization, that enable the organization to conduct operations, including commerce, on a computer network. The term "organization" and "customer" and "user" are used interchangeably. The term "third-party" is used to mean the provider a cloud computing environment.

The term "Virtual Network Operation Center" (VNOC) is used interchangeably herein with the "invention". The VNOC™ solution is a brand name of the present invention available from the assignee Freedom Professional Service & Technologies LLC. doing business as Freedom OSS of Newtown, Pa.

Overview

The present invention enables managing computational services in a cloud computing network. Embodiments of the present invention include integrated cloud service (ICSM) management. Organizations using the present invention as a cloud brokerage solution for low-cost, secure, scalable, on-demand servers and storage. Organizations gain the advantages of the cloud computing environments including on-demand access to computational resources and services while at the same time ensuring end-to-end security, governance and compliance according to an organization needs. The VNOC™ solution is a portfolio of modules including data security, intrusion detection, user authorization and provisioning, corporate access control policies, regulations compliance (SOX, HIPAA, PHI, PII, FISMA), governance, patches and upgrades, server operating systems, server applications (webserver, database, CMS), packaged and custom applications (Java, .NET, PHP, SAP, CRM), and audit trails.

Cloud Computing

A cloud computing environment is service oriented with a focus on statelessness, low coupling, modularity, and semantic interoperability. At the heart of cloud computing is an infrastructure comprising a network of interconnected nodes.

FIG. 1 illustrates an example client system coupled to a cloud computing environment. System 100 may include one or more user systems 102 and one or more administrative systems 104, one or more server systems 406, one or more cloud computing systems 108 and 110, and a network 112. Although this particular implementation of system 100 is illustrated and primarily described, embodiments may include any suitable implementation of system 100 according to particular needs.

System 100 may include one or more user systems 102 and one or more administrative systems 104. Each user system 102 and administrative system 104 may include one or more computer systems at one or more locations. Each computer system may include any appropriate input devices (such as a keypad, touch screen, mouse, or other device that can accept information), output devices, mass storage media, or other suitable components for receiving, processing, storing, and communicating data. Both the input device and output device may include fixed or removable storage media such as a magnetic computer disk, CD-ROM, or other suitable media to both receive input from and provide output to a user of administrative system 104. Each computer system may include a personal computer, workstation, network computer, kiosk, wireless data port, tablet computer, one or more processors within these or other devices, or any other suitable processing device.

System 100 may include one or more cloud computing systems 108 and 110 coupled to user system 102 via network 112. Cloud computing systems 108 and 110 may include one or more electronic computing devices operable to receive, transmit, process, and store data associated with system 100. For example, cloud computing systems 108 and 110 may include one or more general-purpose PCs, Macintoshes, workstations, Linux-based computers, server computers, one or more server pools, or any other suitable devices. In short, cloud computing systems 108 and 110 may include any suitable combination of software, firmware, and hardware. It should be noted that although two cloud computing systems 108 and 110 are illustrated, any suitable number of cloud computing systems may be included in system 100. In addition, there may be multiple groups of cloud computing systems in system 100.

In certain embodiments, cloud computing systems 108 and 110 provide computing resources 124 and 126, respectively, to user systems 102 and administrative systems 104 and charges user systems 102 and administrative systems 104 for their specific use of computing resources 124 and 126. For example, cloud computing resources 124 and 126 may include one or more virtual machines (VMs). As another example, cloud computing resources 124 and 126 may include one or more machine images. A machine image may refer to a bootable file that includes a particular configuration and operating system. As yet another example, cloud computing resources 124 and 126 may include one or more Intel x86 based servers that provide a combination of hardware and software resources.

In certain embodiments, computing resources 124 and 126 may be accessible by cloud computing interfaces 120. From the perspective of user systems 102 and administrative systems 104, renting computing resources from cloud computing interfaces 120 has implications for application providers and IT architects that develop solutions targeted for internal enterprise deployment, rather than on cloud computing systems 108 and 110. For example, an IT architect may desire to deploy web servers, load balancers, and front-end interfaces remotely on cloud computing systems 108 and 110 but keep a database in a local IT environment.

In certain embodiments, a secure connection may be established between cloud computing system architecture 118 and cloud computing systems 108 and 110 over network 112. For example, a secure Hypertext Transfer Protocol (HTTP) connection may be established between cloud computing system architecture 118 and cloud computing systems 108 and 110. A secure HTTP protocol refers to a protocol that provides the ability for secure transactions to take place over network 112. In alternative networks, any suitable data communications protocol may be used to establish a secure connection. Additional details of example embodiments of cloud computing system architecture 118 are discussed in more detail below.

Figure 2:
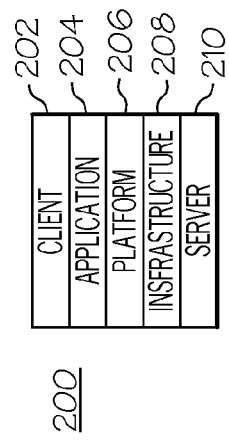
FIG. 2 is diagram of the logical layer of a cloud computing environment of FIG. 1.

Turning now to FIG. 2, shown is logical layer 200 of a cloud computing environment of FIG. 1. Once an Internet Protocol connection is established among several computers, it is possible to share services within any one of the following layers.

Client 202—A cloud client consists of computer hardware and/or computer software that relies on cloud computing for application delivery, or that is specifically designed for delivery of cloud services and that, in either case, is essentially useless without it. Examples include some computers, phones and other devices, operating systems and browsers.

Application 204—Cloud application services or "Software as a Service (SaaS)" deliver software as a service over the Internet, eliminating the need to install and run the application on the customer's own computers and simplifying maintenance and support. People tend to use the terms "SaaS" and "cloud" interchangeably, when in fact they are two different things. Key characteristics include:
- Network-based access to, and management of, commercially available (i.e., not custom) software.
- Activities that are managed from central locations rather than at each customer's site, enabling customers to access applications remotely via the Web.
- Application delivery that typically is closer to a one-to-many model (single instance, multi-tenant architecture) than to a one-to-one model, including architecture, pricing, partnering, and management characteristics.
- Centralized feature updating, which obviates the need for downloadable patches and upgrades.

Platform 206—deliver a computing platform and/or solution stack as a service, often consuming cloud infrastructure and sustaining cloud applications. It facilitates deployment of applications without the cost and complexity of buying and managing the underlying hardware and software layers.

Infrastructure 208—delivers computer infrastructure—typically a platform virtualization environment—as a service. Rather than purchasing servers, software, data-center space or network equipment, clients instead buy those resources as a fully outsourced service. Suppliers typically bill such services on a utility computing basis; the amount of resources consumed (and therefore the cost) will typically reflect the level of activity.

Figure 3:
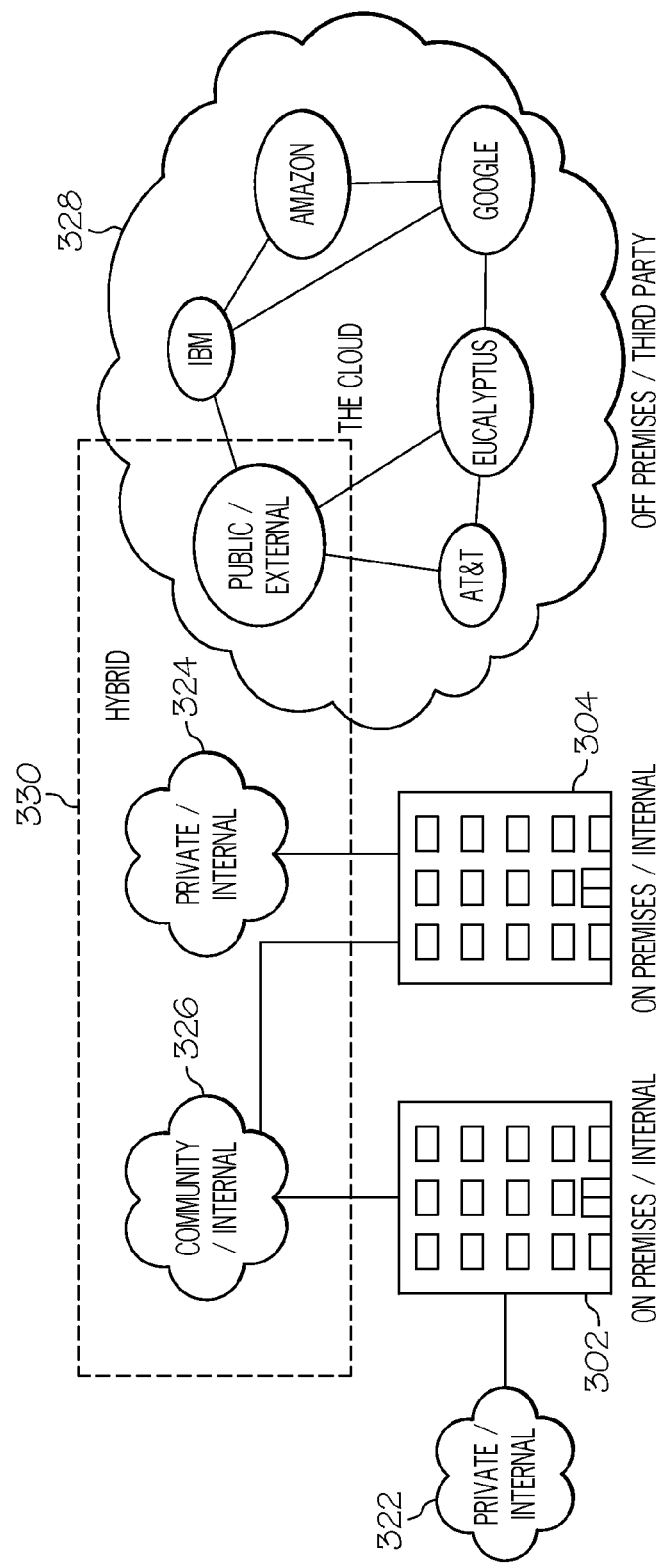
FIG. 3 is diagram of the deployment types of cloud computing environment of FIG. 1.

Server 210—The servers layer consists of computer hardware and/or computer software products that are specifically designed for the delivery of cloud services, including multi-core processors, cloud-specific operating systems and combined offerings Cloud Deployment Types FIG. 3 is diagram of the deployment types 300 of cloud computing environment of FIG. 1. A private cloud 322, 324 is a cloud infrastructure operated solely for an organization, such as, those offered by Eucalyptus®, Amazon®, Nimbula®, and Voxel®. It may be managed by the organization or a third party and may exist on-premises 302 or off-premises 304. Enterprise IT organizations use their own private cloud(s) for mission critical and other operational systems to protect critical infrastructures.

A variation of private cloud is virtual private cloud (VPC), such as Amazon® VPC. A VPC permits users to provision a private, isolated section of the web services private cloud in a definable virtual network. The VPC permits defining a virtual network topology that closely resembles a traditional network that a user might operate in its own datacenter. The virtual network topology includes selection of IP address range, creation of subnets, and configuration of route tables and network gateways and more.

A community cloud 326 is cloud infrastructure established when several organizations 302 and 304 have similar requirements (e.g., mission, security requirements, policy, and compliance considerations) and seek to share infrastructure so as to realize some of the benefits of cloud computing. The costs are spread over fewer users than a public cloud (but more than a single tenant). This option may offer a higher level of privacy, security and/or policy compliance. In addition it can be economically attractive as the resources (storage, workstations) utilized and shared in the community are already exploited and have reached their return of investment. It may be managed by the organizations or a third party and may exist on-premises or off-premises 302, 304.

Public cloud 328 is a cloud infrastructure made available to the general public or a large industry group and is owned by an organization selling cloud services, such as AT&T®, Google®, Amazon®, IBM®, RackspaceCloud®, Terremark® and others. Resources in a public cloud 306 are dynamically provisioned on a fine-grained, self-service basis over the Internet, via web applications/web services, from an off-site third-party provider who bills on a fine-grained utility computing basis.

Hybrid cloud 330 is a cloud infrastructure is a composition of two or more clouds (private 324, community 326, or public 328) that remain unique entities but are bound together by standardized or proprietary technology that enables data and application portability (e.g., cloud bursting for load-balancing between clouds).

Concerns when Migrating to a Cloud Computing Environment

Organizations and companies want to take advantage resources and cost effectiveness of public and hybrid clouds. However, the inventors have discovered when migrating applications to a public cloud, the following concerns are typically raised by managers inside an organization.

Operations Manager
Inventory Management
Governance and workflows
Rules and procedures
Application Development Manager
Release Management
Configuration Automation
Change Management
Business Owner
Governance
Data Security
Project billing
Security Chief Officer
Access Control
Data Security
Intrusion Detection Compliance Officer
Audit Trail
Compliance reporting
Cloud management procedures
VNOC™ Portal The VNOC™ solution is a portfolio of managed services and tools specifically developed and optimized for management of enterprise information technology systems in cloud computing environment. The VNOC™ solution includes software tools and processes to:

monitor health of an unlimited number of computing assets deployed across multiple cloud providers;

maintain security and integrity of variable and an unlimited inventory of computing assets deployed in one or more computing clouds deploy software updates or re-configure variable and an unlimited inventory of computing assets deployed in one or more computing clouds;

deploy computing assets in one or more computing clouds in such a way that meets or exceeds customer business continuity requirements in the event of disaster ensure discovered issues are continuously monitored and resolved according to the terms of the SLA; and result in an actionable entry in the records system where issues can be monitored and resolved.

Figure 4:
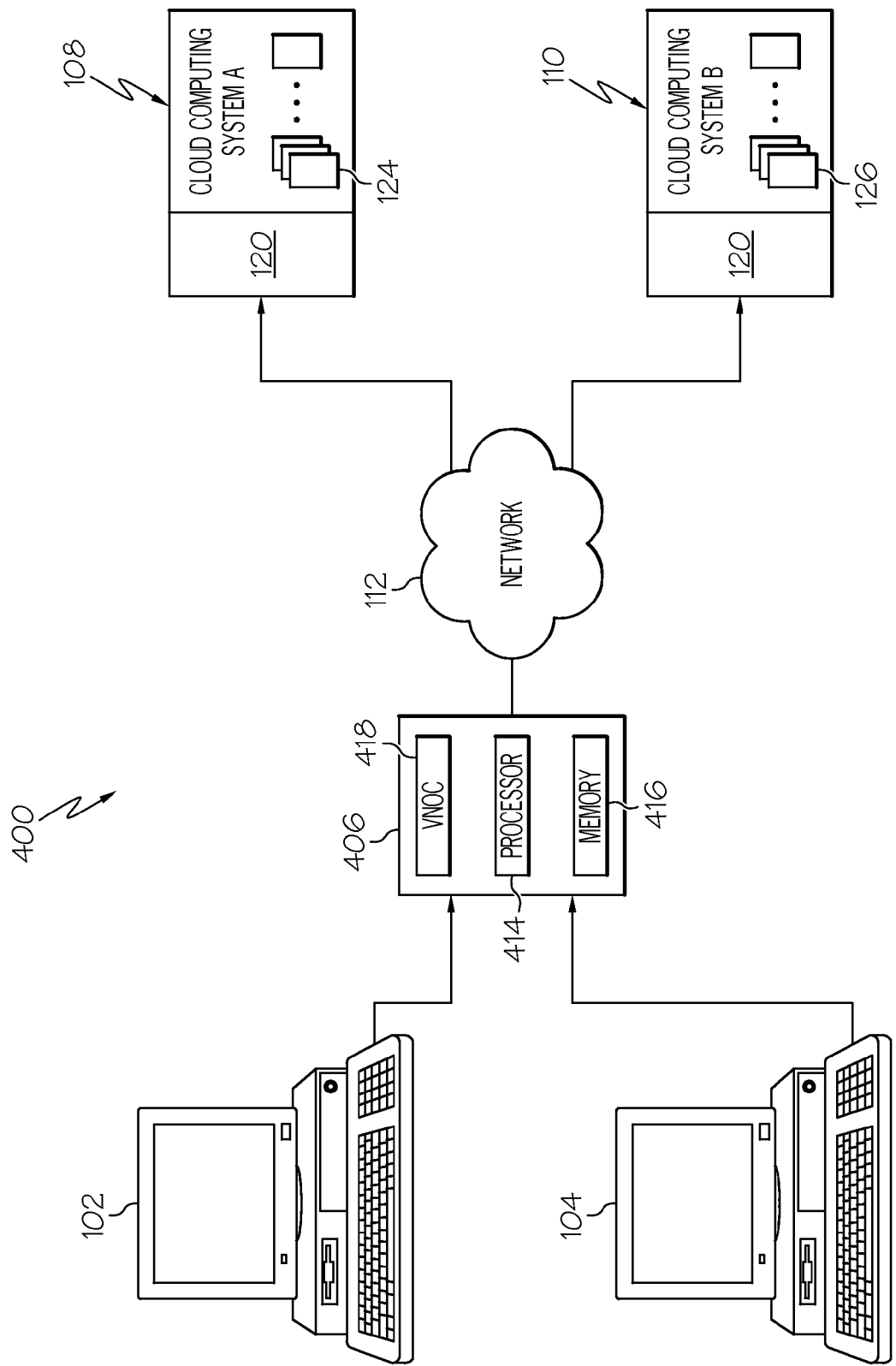
FIG. 4 illustrates an example client system coupled to a cloud computing environment using the VNOC™ solution.

FIG. 4 illustrates an example client system coupled to a cloud computing environment using the VNOC™ solution. Like FIG. 1, system 100 may include one or more user systems 102 and one or more administrative systems 104, one or more server systems 406, one or more cloud computing systems 108 and 110, and a network 112. The VNOC™ solution provides a private portal, with one or more plug-ins with a single view to manage one or more clouds. The present invention allows the management of assets, managing compliance, security, and governance. Computing resources of public cloud computing environments are shared so security, governance, and compliance must be managed completely different than in a private environment. To manage computing resources in a public cloud, customized workflows are used with the VNOC™ solution. Workflows are a sequence of connected steps typically with inputs, outputs and defined purposes. Workflows can be applied to security, compliance and governance and audits.

In general, system 400 is operable to integrate between VNOC™ software components and cloud computing systems. In certain embodiments, system 400 includes VNOC™ server 406 running a web portal with a processing module 414 and a memory module 416. Processing module 414 may include one or more microprocessors, controllers, or any other suitable computing devices or computing resources. Processing module 414 may work, either alone or with other components of system 400, to provide a portion or all of the functionality of system 400 described herein. Memory module 416 may take the form of volatile or non-volatile memory including, without limitation, magnetic media, optical media, random access memory (RAM), read-only memory (ROM), removable media, or any other suitable memory component. Although a single server system 406 is illustrated, some embodiments contemplate system 400 including any suitable number of server systems 406. Moreover, although referred to as a "server system," some embodiments contemplate server system 406 comprising any suitable type of processing device or devices. The VNOC server 406 can be deployed as software running on an organization's hardware, or a complete turn-key solution and licensed as SaaS or under a Managed Services contract.

For example, an external integration architecture may include several VNOC™ software components. According to certain embodiments, adapters are created in a cloud computing system architecture that bridge the architectural layer that encapsulates and abstracts the cloud computing systems while still integrating with enterprise VNOC™ software components. Thus, certain embodiments provide a set of components for life cycle phases of VNOC™ service management, from strategy to design, transition, and operation. In certain embodiments, the cloud computing system architecture is mapped to the different layers of the cloud computing systems, thus serving IT workshops and workers that rent cloud computing resources and manage the cloud computing systems within their own IT organization in an abstract manner. In certain embodiments, the cloud computing system architecture may serve the cloud computing system providers that manage their cloud computing systems and provide VNOC™ integration points to their customers.

VNOC™ Architecture

Figure 5:
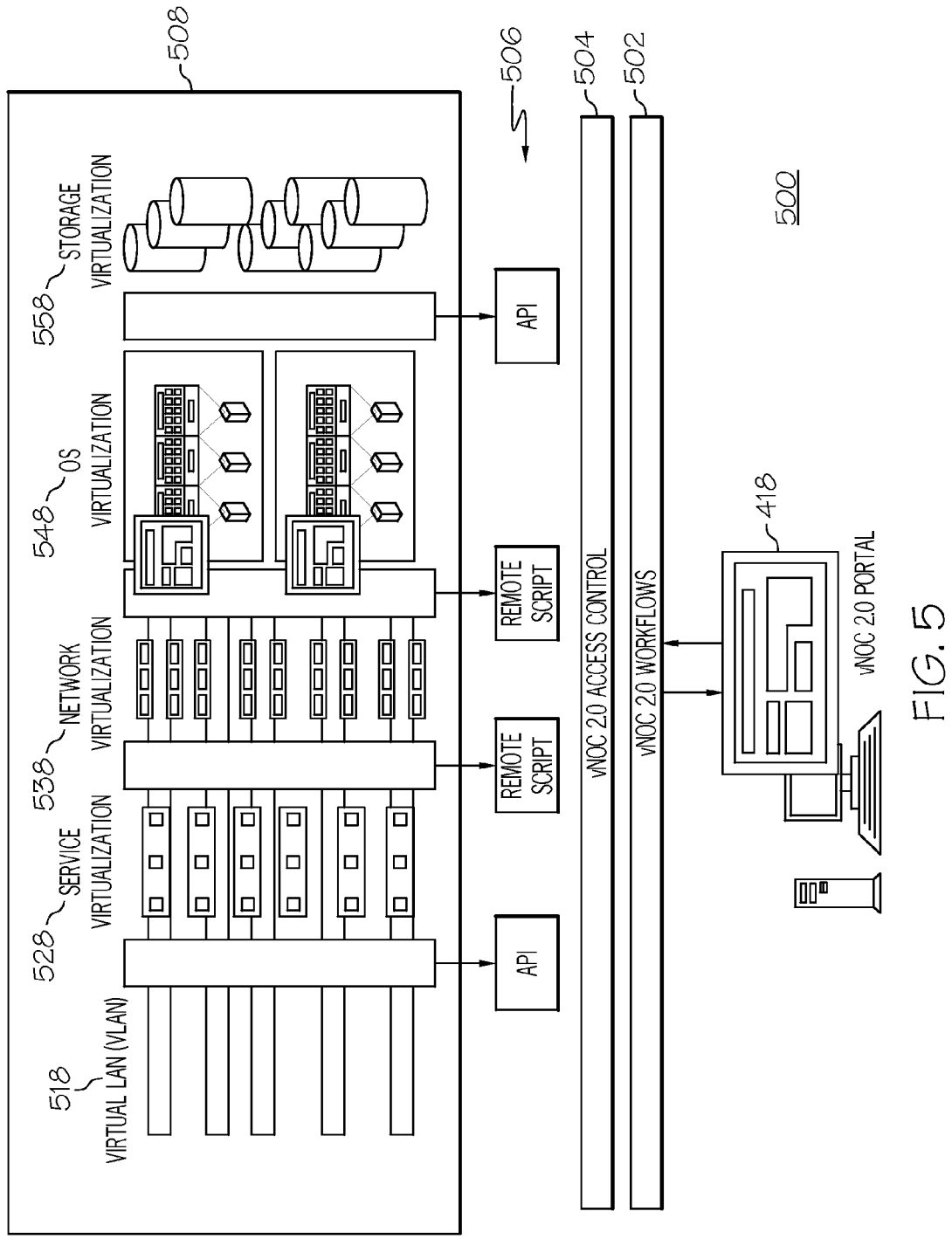
FIG. 5 illustrates the architecture including the access controls and workflows of the VNOC™ solution.

FIG. 5 illustrates the architecture including access controls and workflows of the VNOC™ solution. The portal 418 is coupled to workflows 502 that have been customized for the public cloud environment as further described below. Access control 504 layer uses access control module 526 as described above. A collection of application programming interfaces (APIs) and scripts form the layer 506 between access control and virtualized resources 508 in a cloud environment. The virtualized resources include virtual LANs 518, server virtualization 528, network virtualization 528, OS virtualization 548, and storage virtualization 558.

VNOC™ Core Modules

Figure 6:
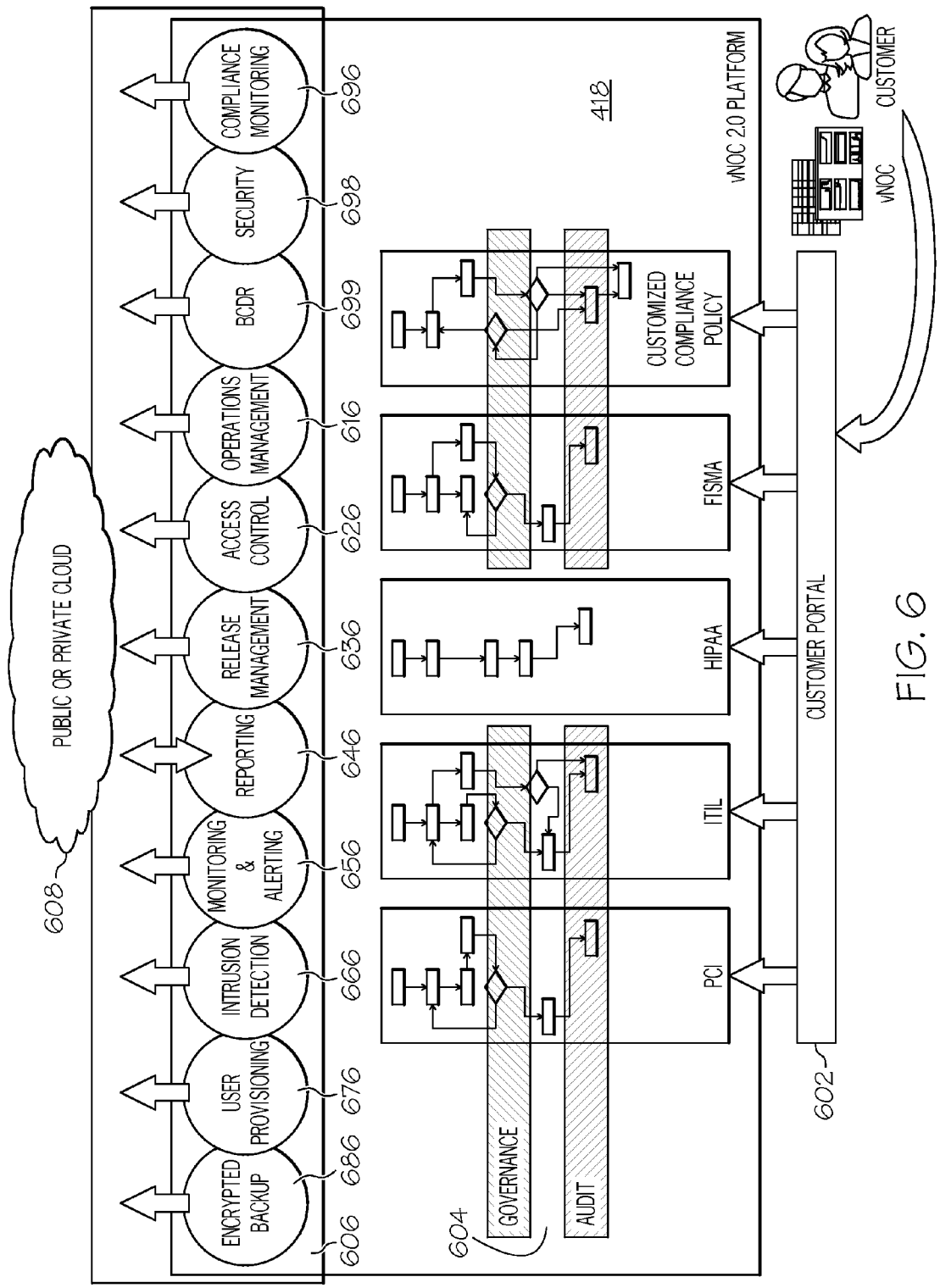
FIG. 6 illustrates the core modules of the VNOC™ solution.

FIG. 6 illustrates the core modules of the VNOC™ solution. Shown are three layers of the VNOC™ solution 418, a customer portal 602, a workflow and/or customized policy layer 604, and a multiple modules 606 coupled to a cloud computing environment 608. The modules 606 are distinguished as separate modules that can be used and sold independently. The VNOC™ solution allows for the management of security, compliance and governance for the organization. Companies and organizations receive the costs and performance benefits of public clouds, virtual private clouds, and hybrid clouds while managing their data as if a private cloud.

VNOC™ Platform 418

The VNOC™ platform acts as an operation and control hub to tie all of the functional modules of the system together.

Operations Management 616

Operations Management 616 module or OP module is a software component responsible for provisioning and managing computing resources hosted by multiple cloud providers, allowing users high degree of flexibility in terms of location and pricing. OP interacts with multiple cloud providers via their respective proprietary programming interfaces while exposing only one common interface to the end-users. Once computing resources have been provisioned, OP can be used to re-purpose provision computing resources to perform a different function or to terminate them. OP Module is made up of following subcomponents:

Inventory System—is responsible for maintaining a list of active and in-active computing assets.

Controller Interface—is responsible for communicating via proprietary programming API with of each cloud provider.

Operations System—is responsible for executing arbitrary functions on multiple pre-provisioned computing assets but only requiring the user to specify input once and then returning the output from multiple assets back to the user. Operation System is massively scaled and allows parallel execution of the user commands.

Auto Scaling System (ASS)—When used in conjunction with System Monitoring module, ASS has an algorithm to ensure that computing capacity meets a varying demand in computing. ASS Algorithm can:
Preemptively increase or reduce capacity; and
Change capacity based on its ability to detect demand via System Monitoring module.

Access Control 626

The Access Control 626 module includes authentication, authorization and audit. It also includes measures such as biometric scans, hidden paths, digital signatures, encryption, and monitoring. Users with proper permissions can perform actions on resources of the system. Access control works with a portfolio of security software tools aimed to address primary security risks associated with operating infrastructure in a cloud computing environments. VNOC can integrate with a variety of third party access control and authentication systems like Microsoft's Active Directory.

Release Management 636

The Release Management 636 module or Software Configuration Automation Module (SCA) module is a software component aimed to facilitate change management across massively scaled infrastructure deployed at many cloud providers facilities and geographically distributed around the world.

SCA module's primary function is to ensure that computing assets maintain the desired state of configuration and to ensure that any changes applied to assets via un-authorized channels are un-done.

SCA is Made Up of Following Components:
Agent—executes on all of the computing assets and verifies the state of computing assets minors desired configuration specified by the server.
Server—provides agents with latest state configuration information and allows them to download latest code, executables.

In order to verify authenticity of the agents and not accidentally release the source code or other IP/trade secrets to unauthorized parties. Server implements an algorithm called "Hypervisor Based Authentication", where in a computing asset proves its authenticity by performing an action requiring access to hypervisor and action that can be independently verified by the server.

In addition server verifies that the agent has not been compromised in any way prior to releasing any information to it. Computing Asset Integrity Check algorithm can be used to verify compromise/no compromise state of many different computing assets with varying state configurations. Integrity Check is performed as often as often as required and servers can be scaled to handle an unlimited number of incoming integrity checks as well as requests for latest state configuration.

Figure 14:
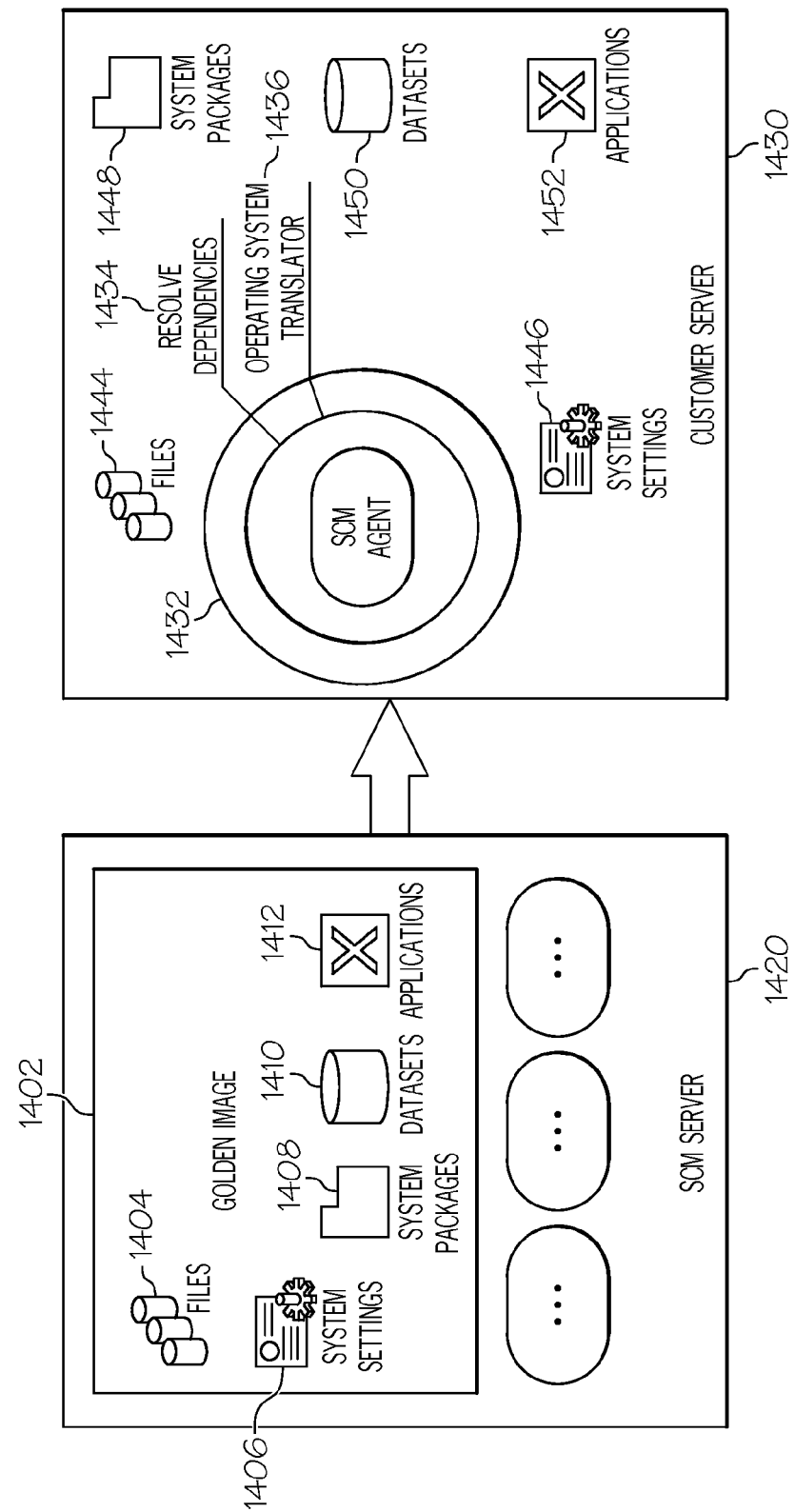
FIG. 14 is a VNOC™ solution for release and patch management.

FIG. 14 is a VNOC™ solution for release and patch management (SCM). A golden image includes one or more of files, 1404, system setting 1406, system packages 1408, datasets 1410 and application 1412 residing on a SCM server 1420. This golden image are provisioned on targeted machines 1430 using a SCM agent 1432. The agent includes dependencies that need to be resolve during patching and upgrading. For example, application 1452 may require a certain level OS to run. Operating system translators 1436 are also included. Patch management may include reminders, staging of patches on servers, testing or patches on staging server and finally management of patches being deployed to a production environment. The particulars of the patching is governed by an organizations policies in the customized workflows.

Reporting 646

Reporting and logging is a challenge in a cloud computing environments when an instance of a virtualized resource, such as virtual machines and virtual networks, last for a short period of time, before the resource is re-deployed. Logging events are lost when the resource is re-deployed. Stated differently logs of virtualized instances disappear when the resource is re-deployed. To overcome this problem, The Reporting 646 module including Log Vaulting is a software component that allows vaulting or dumping of system and application log files into a centrally managed log servers where logs are stored, indexed, archived, backed up and protected from unauthorized alteration. LV implementation leverages hypervisor based authentication algorithm described earlier to verify authenticity of the sending machines and also uses its own algorithm to reduce the performance impact of shipping logs to log servers via intelligent throttling and network capacity detection.

Figure 10:
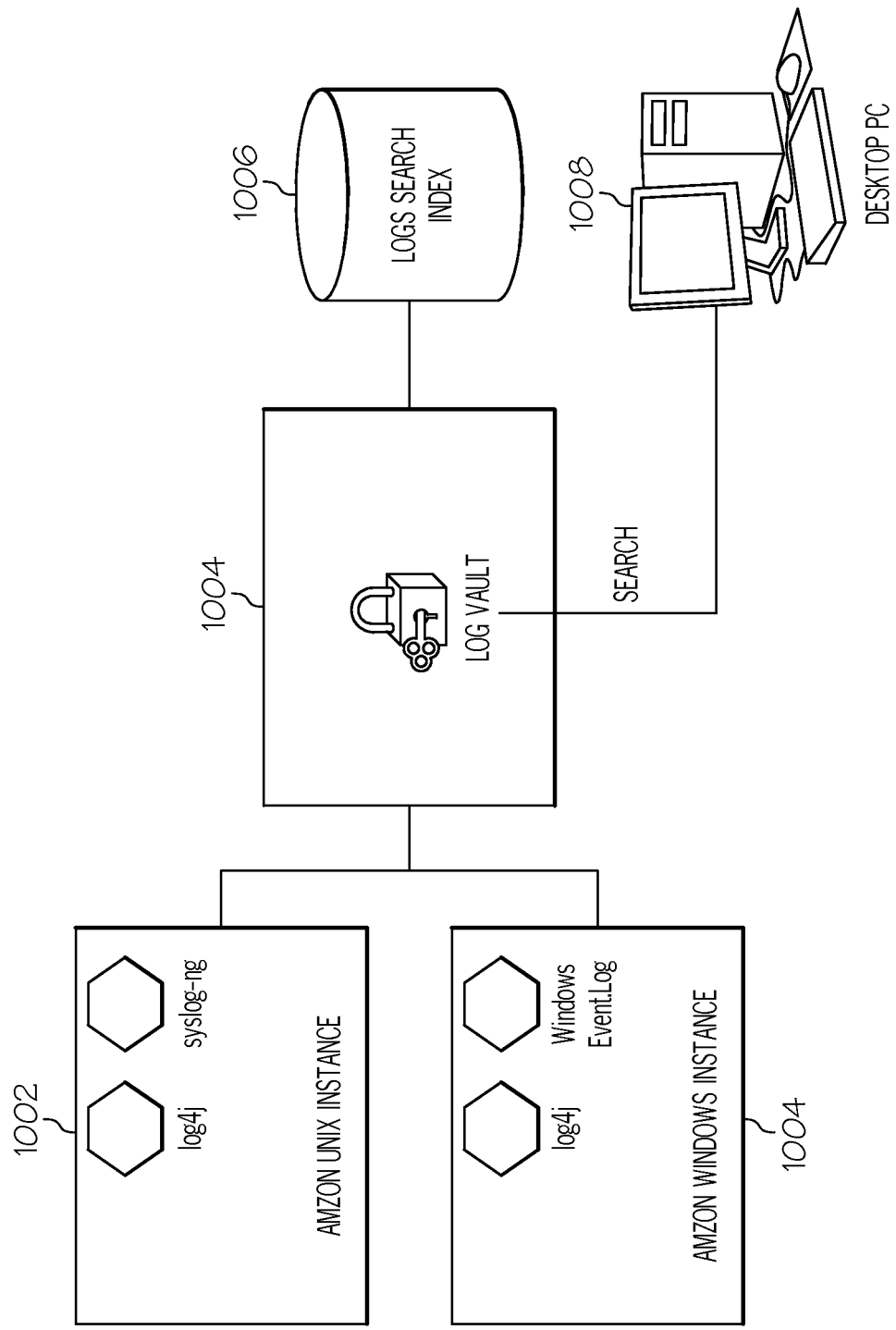
FIG. 10 the VNOC™ solution for log vaulting.

Log Vaulting—is a software component that allows vaulting or dumping of system and application log files into a centrally managed log servers where logs are stored, indexed, archived, backed up and protected from unauthorized alteration. LV implementation leverages hypervisor based authentication algorithm described earlier to verify authenticity of the sending machines and also uses its own algorithm to reduce the performance impact of shipping logs to log servers via intelligent throttling and network capacity detection. The granularity and content of the reports are set through policies. This is shown in FIG. 10. Each instance of VM 1002 in this example Unix and 1004 windows sends logs to log vault 1004. A search index is automatically created for the log entries to enable finding the compiled log events. Investigators and auditors using a client 1008 can use the search index 1114 to make finding logged events from applications, security, DDoS, etc. quicker to locate.

Monitoring & Alerting 656

Figure 15:
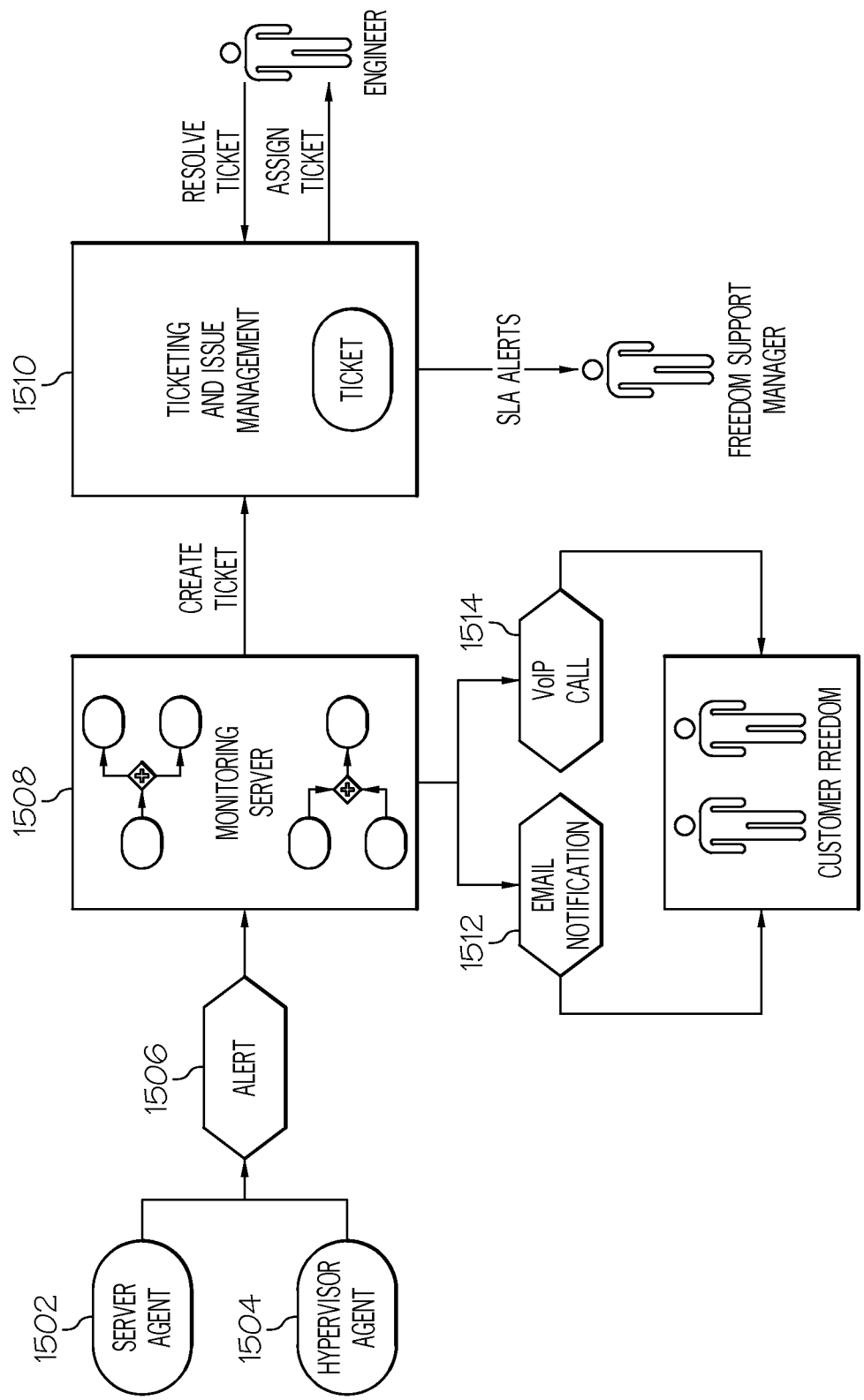
FIG. 15 is a VNOC™ solution for monitoring process flow.
Figure 16:
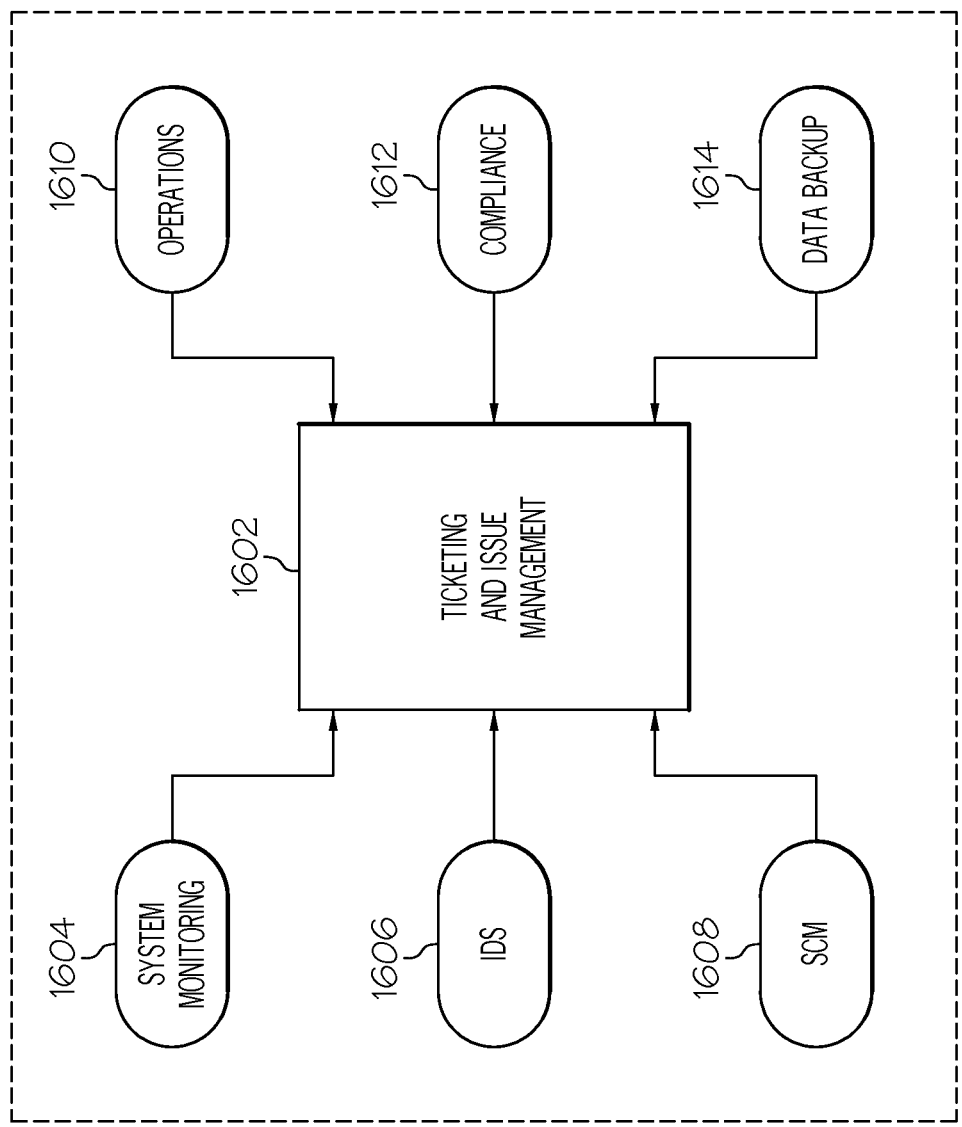
FIG. 16 is a VNOC™ solution for ticketing system integration.

FIG. 15 is a VNOC™ solution for monitoring process flow. The Monitoring and Alerting 656 module is a software component responsible for monitoring availability of computing assets and their ability to perform intended function. System Monitoring is specifically designed and developed to handle massively scaled environments to manage an unlimited number of servers deployed across the globe. System Monitoring Module is made up of following components:
Agent, 1502 and 1504—is a component that is installed on the computing asset. Agent is responsible for monitoring the health of the commuting asset and transmitting this data 1506 to the server. There is a server agent 1502 and a hypervisor agent 1504.
Server 1508—is a component that is responsible for handling all of the incoming data from the Agents. Server can then choose to issue alert based on rules or invoke corrective functions. A ticket 1510 may be created or notification sent by email 1512 and telephone such as voice over IP (VOIP) 1514. FIG. 16 is a VNOC™ solution for ticketing system integration. A main software module 1612 receiving communications from various components such as system monitoring 1604, Intrusion Detection System (IDS) 1606, SCAM 1608, operations 1610, compliance 1612, and data backup 1614.
Alert Suppression Engine—System Monitoring module distinguishes itself from others in its ability to reduce information overload to the end users through a highly intelligent alerts suppression algorithm reducing potentially millions of events down to few. (Not shown)
Root Cause Analysis System—RCA is another subcomponent of Systems Monitoring module capable of analyzing incoming alerts and establishing what the root cause of the problem might be. RCA is capable of learning over time the relationships between various components through a unique learning algorithm capable of doing immediate impact assessment and root cause analysis. (Not shown).

Compliance Monitoring and Auditing 596

The Compliance Monitoring and Auditing (CMA) 596 module is a software component responsible for performing automated checking to detect whether deployed computing assets are operating and configured within the boundaries of the customer specified compliance policy. In addition, CMA detects any changes to the state of any asset or changes to the inventory and logs them into its own auditing mechanism. CMA is capable of performing compliance checking according to template compliance policies derived from such standards as, National Institute for Standards and Technology (NIST) Cloud Computing Synopsis and Recommendations, or SP 800-146, PCI (Payment Card Industry), ITIL (Information Technology Infrastructure Library), HIPAA (Health Insurance Portability and Accountability Act); FISMA (Federal Information Security Management), and 1S020000. In addition CMA change detection algorithm is capable of detecting changes on any computing asset regardless of the cloud provider and then securely transmit detected changes to the auditing server.

Intrusion Detection 666

Intrusion Detection—is a software component which executes on a managed computing asset and is capable of detected intrusion attempts from outside as well as from authorized users to attempt to escalate their privileges or attempt to alter the state of the system using unauthorized procedures. ID employs its own algorithm specifically developed for cloud computing environments where number of computing assets can be an unlimited by reducing information overload and splitting ID events or alerts into multiple severity levels. ID algorithm reduces information overload by categorizing ID attempt alerts into multiple degrees of severity.

Figure 9:
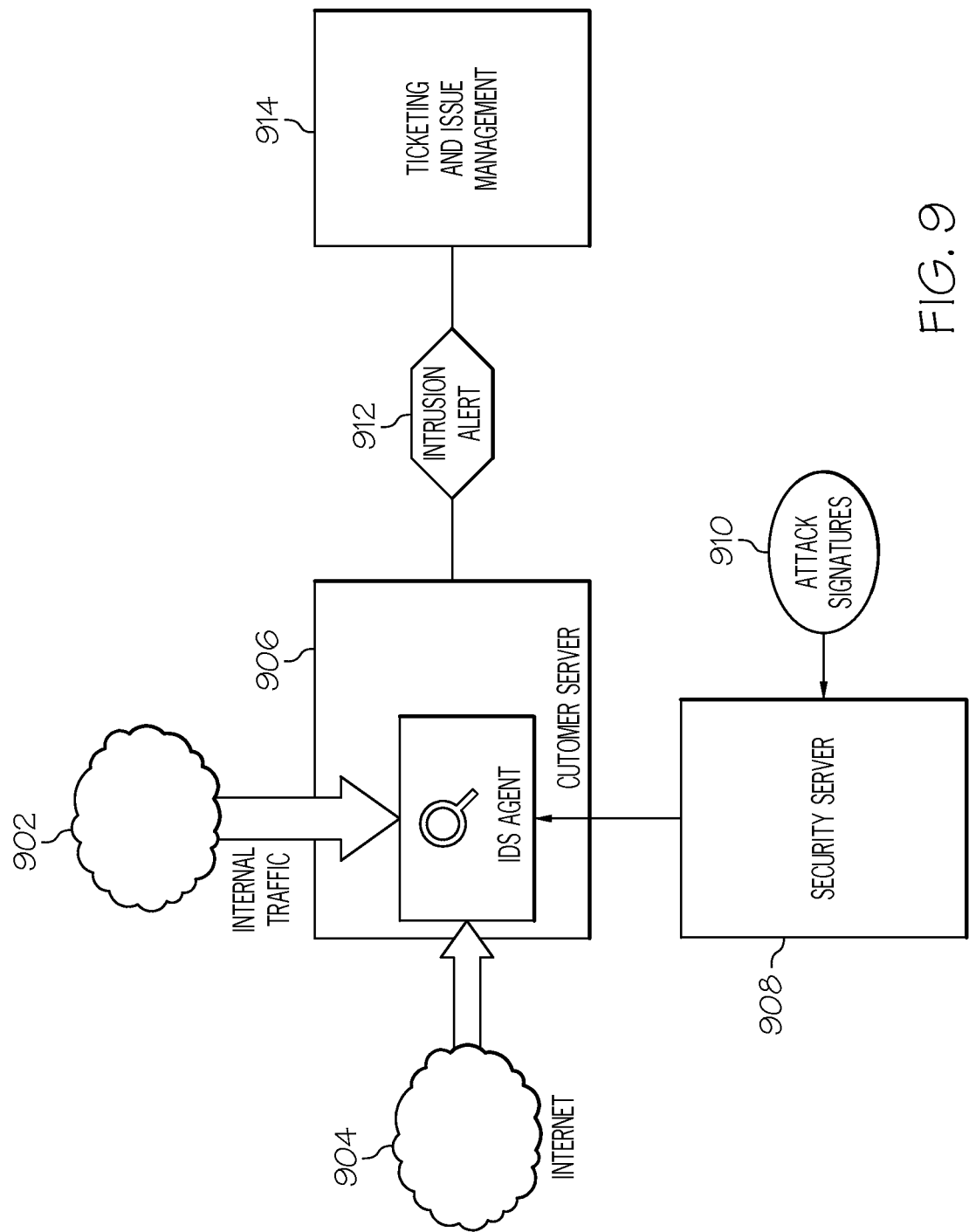
FIG. 9 the VNOC™ solution for intrusion detection.

As shown in FIG. 9, the VNOC™ intrusion detection solution employs custom cloud centric rules or attach signatures 910 to monitor every virtual machine and determines if there is any unauthorized access to any of those machines. Unauthorized access can originate from a person or a computer or both from internal traffic 902 or public internet traffic 910 as shown. In the event unauthorized access is detected 906, various alert mechanisms 912, 914 are used. It is important to emphasize that the customized rules are not rules common to a data center environment, rather made specifically for a cloud environment.

User Provisioning 676

User Provisioning facilitates opening, tracking and closing of the issues that arise while providing managed services to VNOC™ customers. A ticketing system implements a process by which timely issue resolution is ensured and that the issues are open for all services related problems. The ticketing system can be accessible from within all other VNOC™ components. Thus all issues of importance are logged into a ticketing system. This system is known as "Closed Loop Managed Services" meaning that all issues discovered by VNOC™ components are logged into ticketing system, monitored and resolved there within desired time.

Encrypted Backup 686

Encrypted Back Ups 686 is a software package that allows customers perform backups and then encrypt them using same tooling and interface regardless of where the data is located or which provider is hosting the infrastructure. Encrypted Back Ups algorithm will perform the backup via cloud provider specific programming interface and ensure that the backed up data is encrypted. Full encryption is performed with advanced encryption standard (AES) to protect data in storage. Therefore even if a cloud provider changes out a physical storage drive, the data on the drive is encrypted automatically. The physical disk is encrypted on the virtual machine 608. Typically the boot partition is not encrypted but everything else on the disk is automatically encrypted. Customer applications running currently without encryption of data storage, when used with the VNOC™ solution do not have to change their application to use their data. Rather, this encryption is done at the server level 210 in a transparent manner with no specific software or hardware required for the customer to install.

Zero Key Management (ZKM) is a software package that allows management of computing assets on the cloud without the need of storing sensitive information on the servers. ZKM algorithm can avoid the need of storing the sensitive information on the computing assets by interacting with hypervisor via a pre-selected and trusted management server or by providing assets with one time secrets that can only be used for intended actions established by the management server. A computer is used that is separate from an operational computing environment but within the trusted computing environment in the third-party computing environment.

Figure 12:
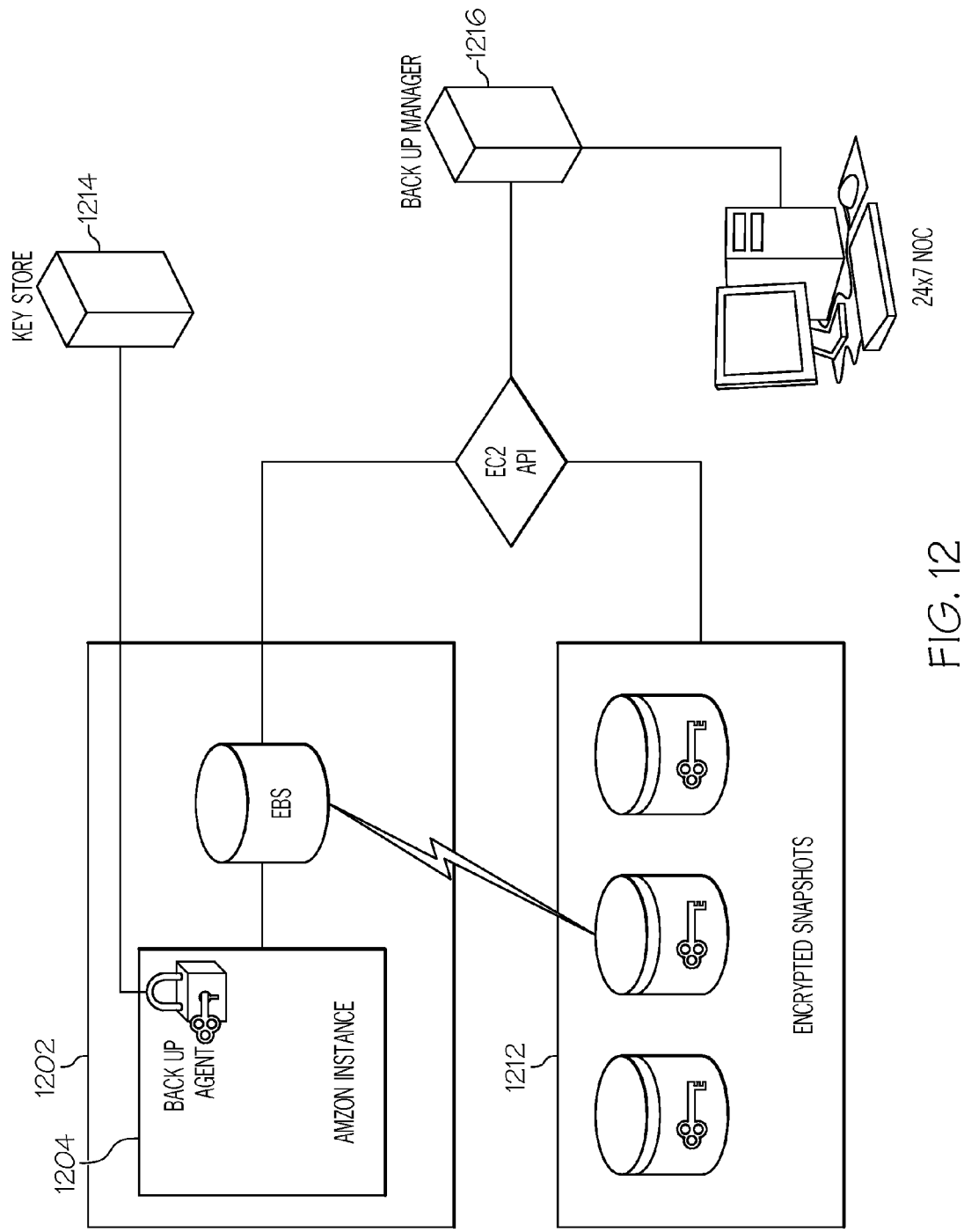
FIG. 12 is a VNOC™ solution for secure backups.

FIG. 12 is a VNOC™ solution for secure backups. A backup manager 1216 runs scheduled and unscheduled encrypted backups snapshots (EBS) 1212. The backup agent 1204 sends the encryption keys to the key vault 1212.

Business Continuity and DR Module 699

Business Continuity (BC) and Disaster Recovery (DR) is a combination of an algorithm and a process allowing users to deploy computing assets performing a specific function in such a way that meets their business continuity and disaster recovery time objectives. BCDR module takes as input from the users following parameters (RTO—Recovery Time Objective, and Recovery Point Objective.) Based on these two parameters and budgetary constraints, BCDR algorithm will be continually running ensure there is computing capacity deployed in multiple locations providing access to redundant energy and network providers. BCDR algorithm also ensures that computing capacity is deployed in low correlation data canter location in different flood plain zones and independent earthquake zones.

Security 598

Security 598 is a portfolio of software tools aimed to address primary security risks associated with operating infrastructure in a cloud computing environments. Enterprise security is made up following components.

Encryption of data in transit—to handle the lack on security in public clouds, all communications between data center and applications and between servers are encrypted. An encrypted tunnel is created for each communication path. This encryption is done in a transparent manner in the infrastructure level 208 with no specific software or hardware required for the customer to install.

Figure 7:
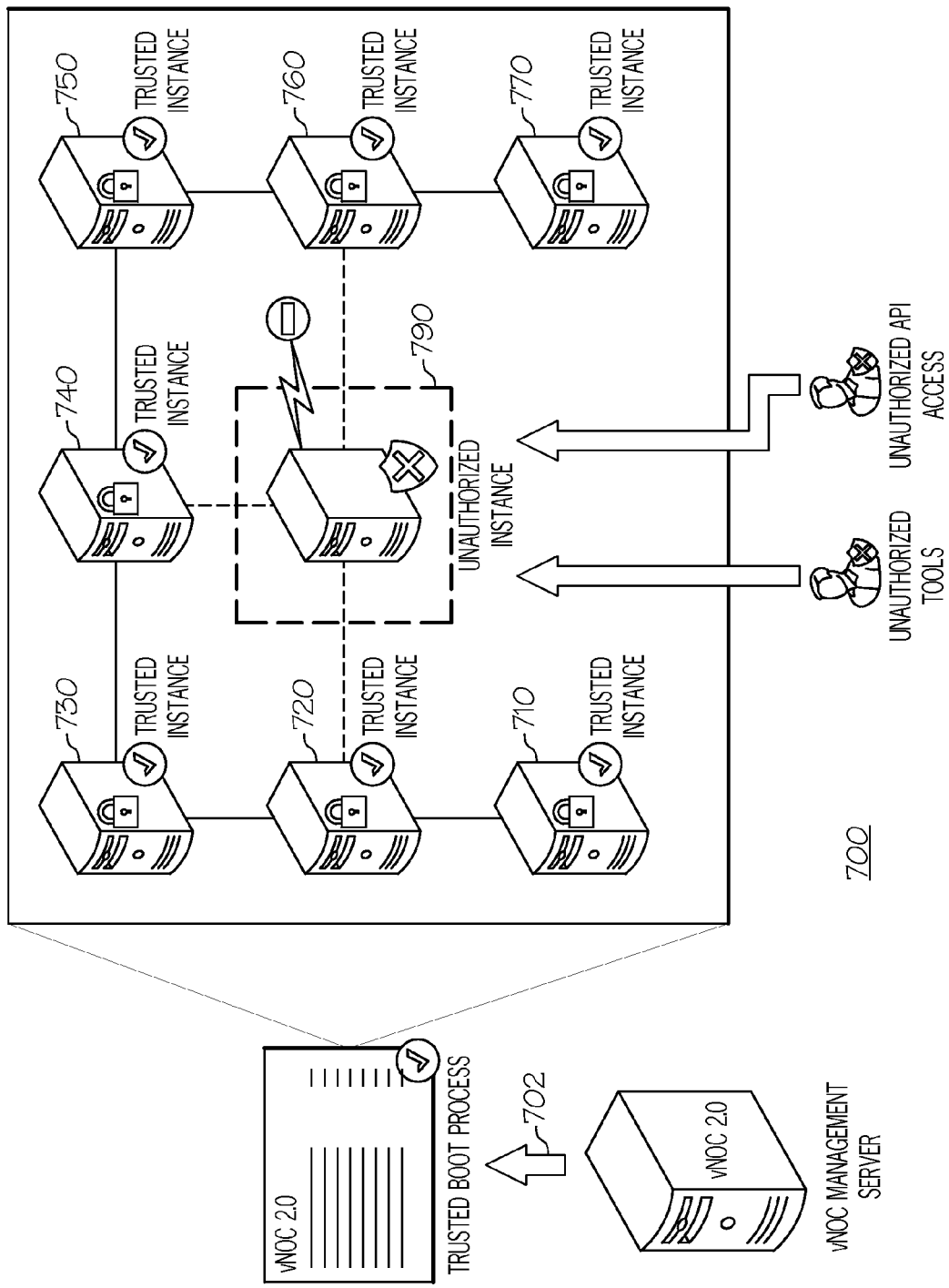
FIG. 7 is the VNOC™ solution for VLAN or virtual network.

VLAN 700 or virtual network 638 is shown in FIG. 7. This includes a trusted boot process that when a virtual machine (VM) is brought up in the cloud, such as in auto scaling, to participate in a workload. In this trusted boot 702 process no data is shared, such as database connection information, web service passwords, etc., with a new VM until the machine has been verified with an encrypted token exchange. Once a machine has passed the trusted boot process 702, the machine is a trusted instance 710 through 770 on the VLAN 638 to create a trusted computing environment or "a trusted hive"

within a third-party cloud computing environment. A trusted hive means this instance is validated and secure regardless of the type of cloud computing environment. In contrast, any other VM 790 that is stated that fails this encrypted token exchange will not be allowed on the VLAN 638, gets isolated and quarantined depending on the workflows configured.

Managing the encryption keys and passwords is another area of security. When keys are not stored or managed security, it can be easily compromised rendering the encryption useless. In face many times, organization will store their encryption keys on the same server as the encrypted data itself. The VNOC™ solution provides a secure vault server to store keys for file encryption, auditing, access control, authentication, session encryption. This secure vault can be stored in a secure database locally on customer drivers or in data center.

Figure 8:
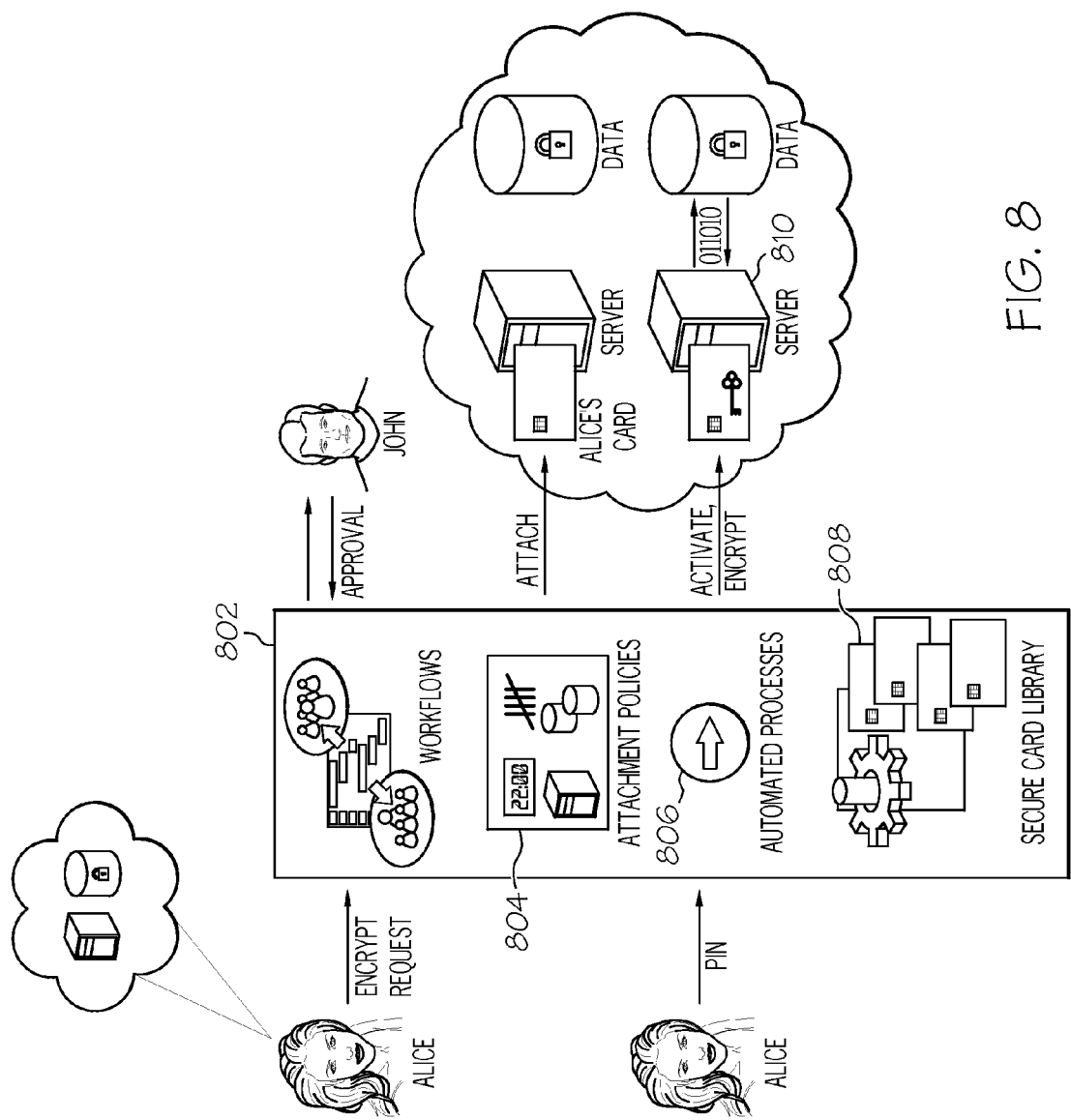
FIG. 8 is the VNOC™ solution for virtual access card.

Another area for security is a virtual access card in FIG. 8. In cloud there is no physical access to the servers. The virtual access cards 808 allows the retrieval and application of private keys automatically with VNOC™ solution 802. During the retrieval there is a two factor authentication. Once the user is authenticated all the keys associated with the user are automatically 806 applied as part of the policy 804. This is accomplished with a database of keys 810 for each users.

Figure 11:
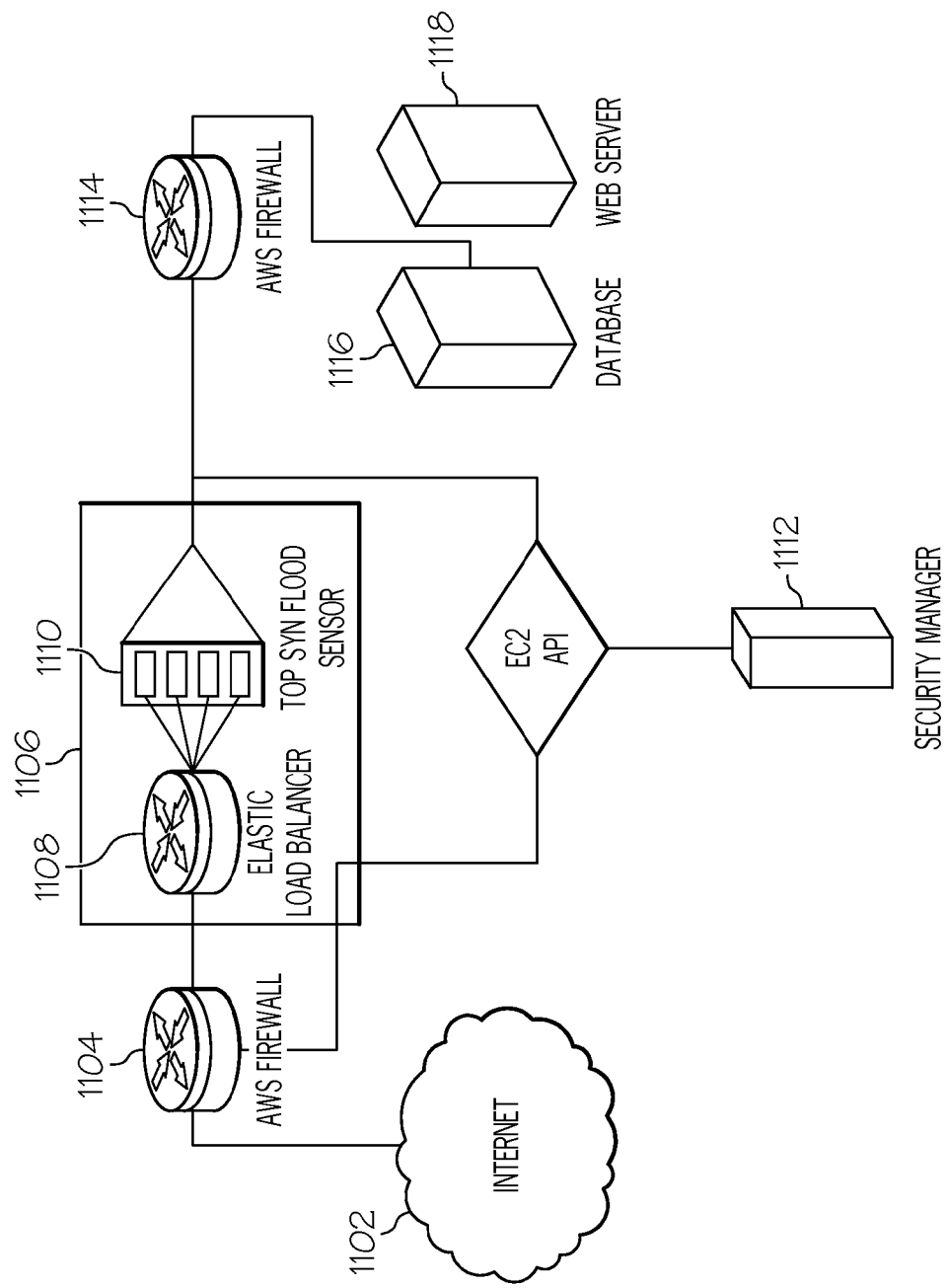
FIG. 11 is a VNOC™ solution for DDoS (Distributed Denial of Service) attacks.

FIG. 11 is a VNOC™ solution for DDoS (distributed denial of service) attacks. Here the security manager 1112 deals with detecting HTTP and TCIP attacks 1106 emanating from the internet 1102 behind firewall 1104. If an attack is detected, then bandwidth is squeezed, cutting off certain IP address, cutting off certain geographic regions, all handled by firewall 1114.

Governance 604

Figure 13:
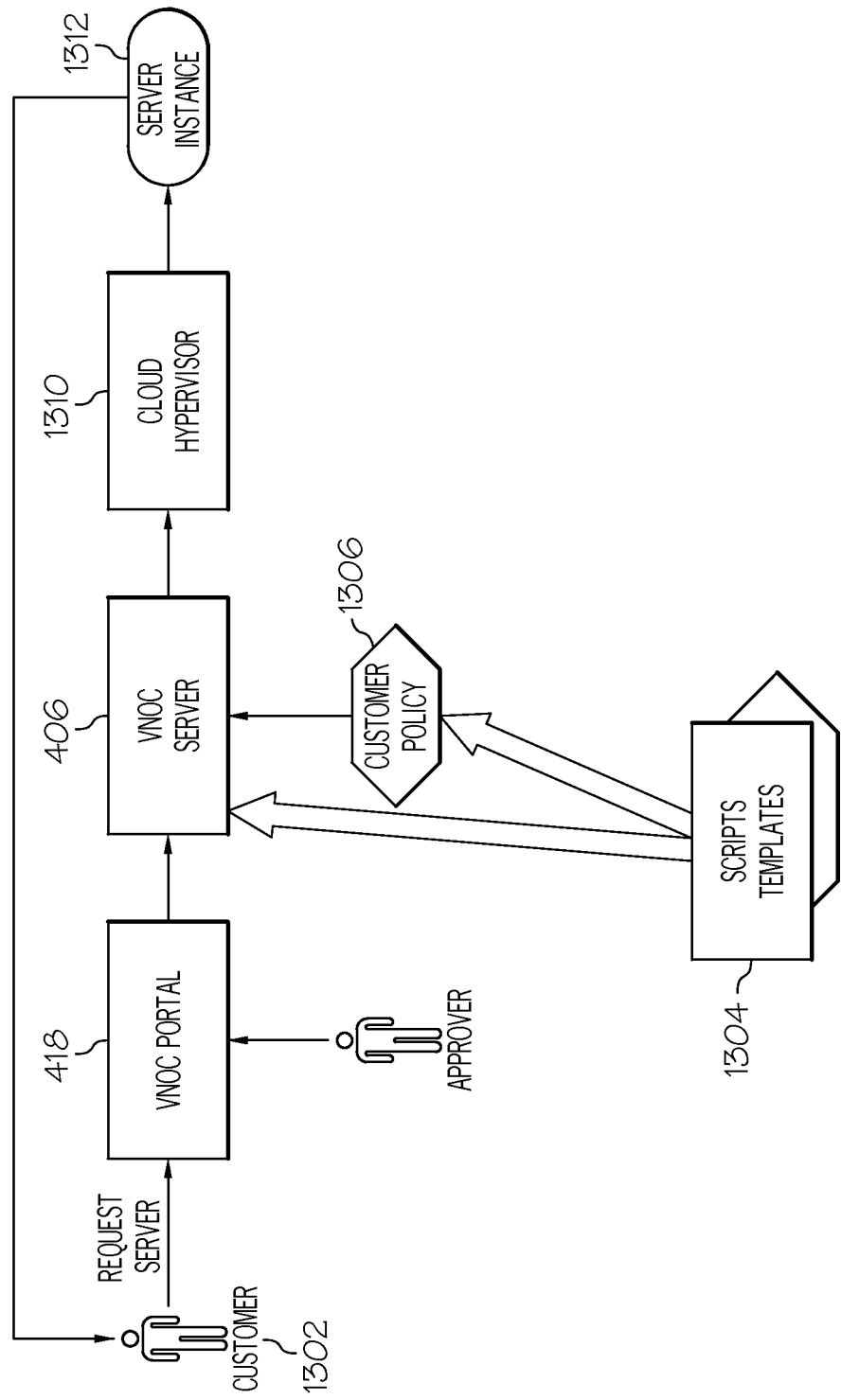
FIG. 13 is a VNOC™ solution for cloud governance.

FIG. 13 is a VNOC™ solution for cloud governance. A cloud in general is a self-service environment. Users request from cloud providers additional computational resources. Governance module includes approval process and limits set by workflow policies and script templates include customer policies 1306 before a user 1302 making a request through the VNOC™ portal 418 running on server 406 enables a new server instance, authenticated by cloud hypervisor to create a new instance of the server 1312. This governance can be automated workflows where a certain dollar amount for a certain employee is authorized. In another embodiment, an organization's policy for governance may include a human review of requests for budgetary reasons.

Flow Diagram

Figure 17:
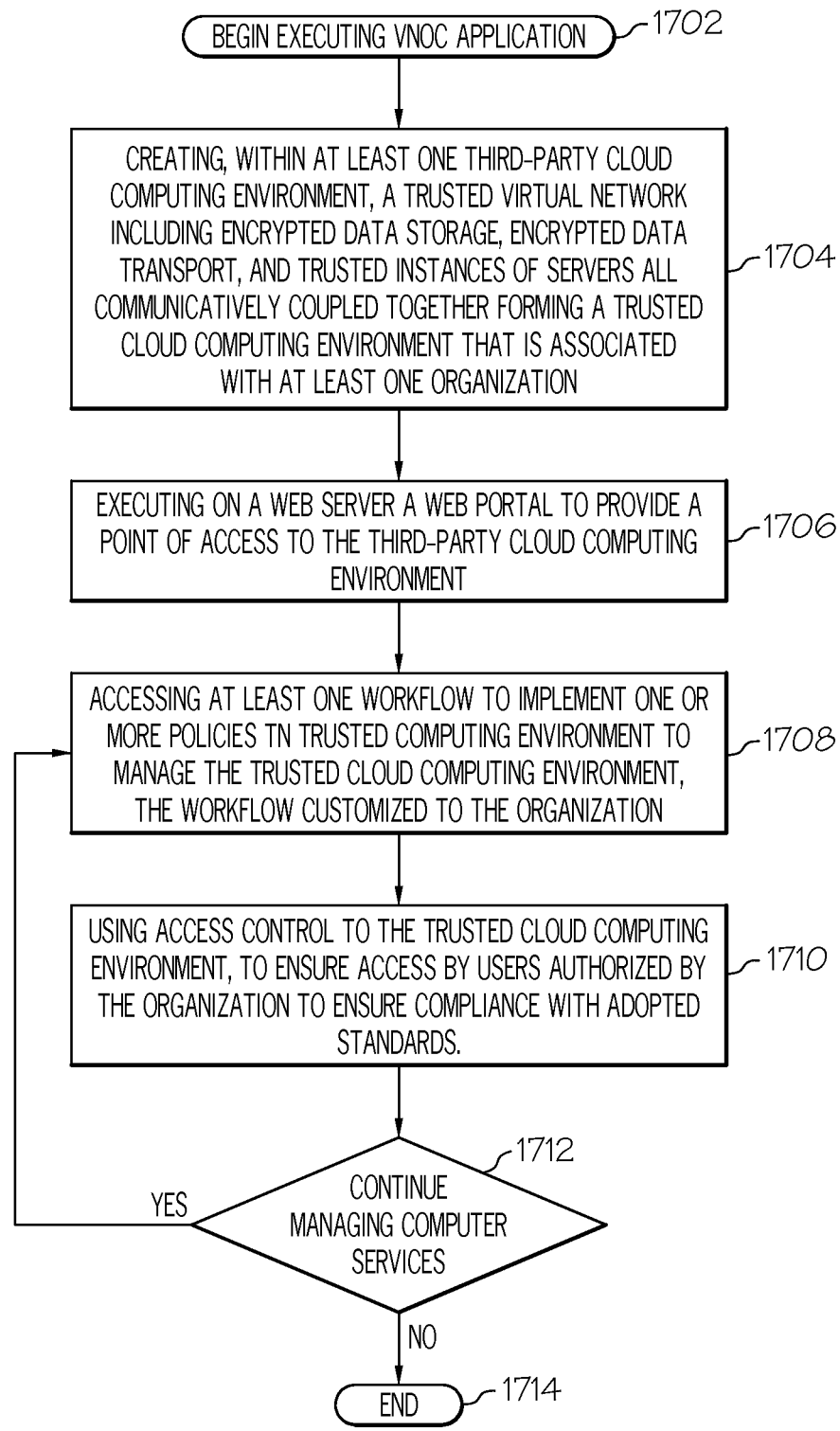
FIG. 17 is a VNOC™ solution workflow.

FIG. 17 is a flow chart of a VNOC™ solution. The process begins in step 1702 with the execution of VNOC™ application. In step 1704, within at least one third-party cloud computing environment, a trusted virtual network including encrypted data storage, encrypted data transport, and trusted instances of servers all communicatively coupled together are created to form a trusted cloud computing environment that is associated with at least one organization. Next in step 1706, e a web portal is executed on a server to provide a point of access to the third-party cloud computing environment. Next in step 1708, at least one workflow is accessed to implement one or more policies in trusted computing environment to manage the trusted cloud computing environment, the workflow customized to the organization. In step 1710, access control is used to the trusted cloud computing environment, to ensure access by users authorized by the organization to ensure compliance with adopted standards. In an embodiment, the workflow including utilizing at least one of the customer's own policy to create the workflow. The customer policies include management of monitoring, ticketing, identity management, and DDoS. In the event there is not more management of computing services the process ends in step 1712, 1714, otherwise the process continues back to step 1708.

Work Flow

Figure 18:
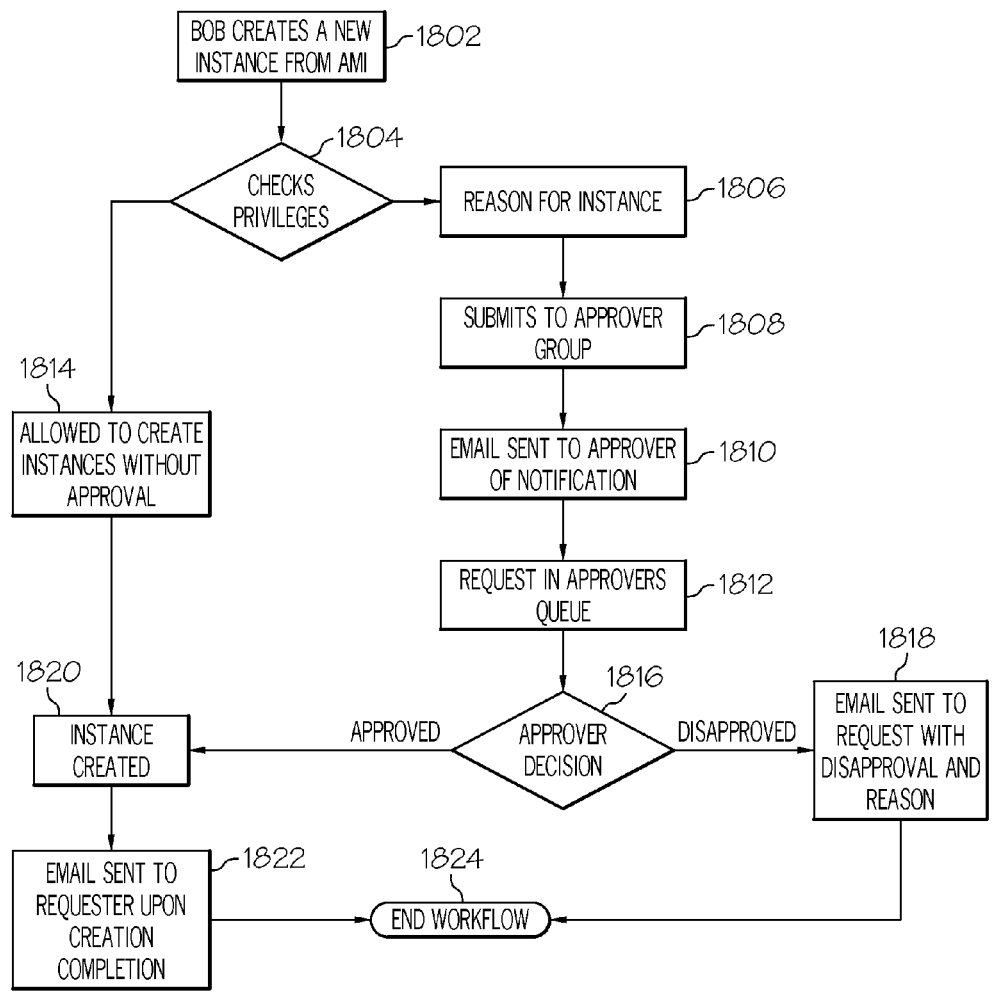
FIGS. 18-20 are examples of VNOC™ solution workflows.
Figure 19:
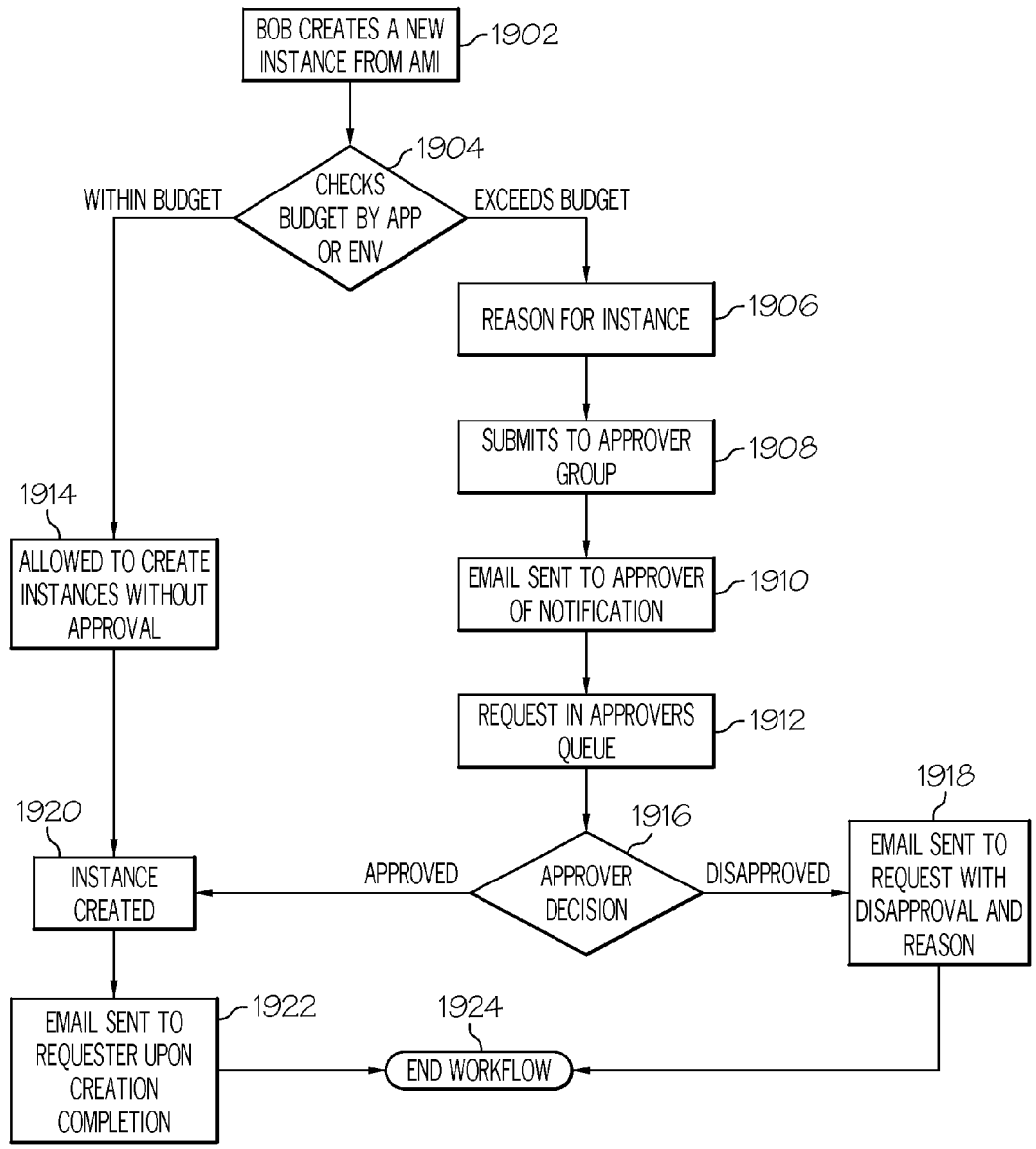
Figure 20:
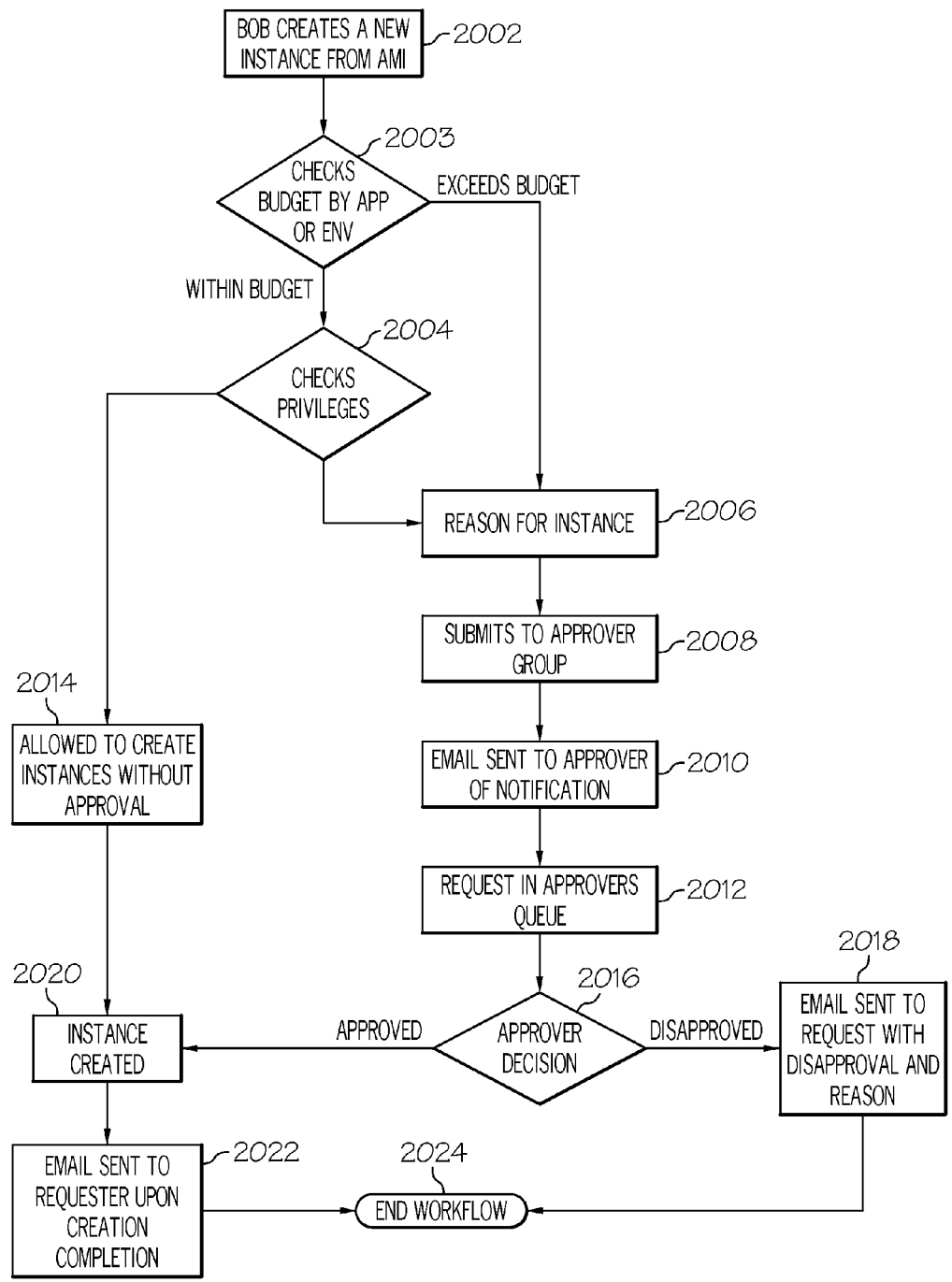

FIGS. 18-20 are examples of VNOC™ solution workflows. These are example workflows and typically in real deployment these workflows would be more complicated. These workflows are directed to an example of provisioning a VM on the trusted cloud environment by a user "Bob". Turning to FIG. 18, in step 1802, Bob requests creation a new VM. A based line script for requesting a type of VM such as an Amazon® Machine Image (AMI) for Windows, Unix 64 bit and others. The base line script is typically a starting point. Next in step 1804, a decision made to determine if Bob has the privileges i.e. what is his role (user, application owner, and administrator). In the case Bob has the appropriate privileges, the process continues to step 1814 and the instance is created in step 1820. The notification, typically by email 1822 is sent to Bob that the instance has been successfully created and the process ends in step 1824. In the event, Bob does not have the privileges a sequence of approvals is initiated. In step 1806 the reason Bob is requesting the VM is submitted to the appropriate approval group 1808 with an email 1810 sent to the approver and put in approver's queue 1812. In the event the approver approves the request in step 1816, the process continues to step 1820, 1822, and ends in step 1824. On the other hand, in the even the approver denies the request from Bob for the additional VM, a notification, typically via e-mail is sent to Bob in step 1818 and the workflow terminates in step 1824.

Turning to FIG. 19, the steps are identical to steps above for FIG. 18 but in this example workflow is a budget based decision 1904 rather than a privileges decision. All the remaining steps would be identical. In this case, the approver is for an application running on a VM rather than the VM itself. The application has a cost associated with it and must be within a budget. In this example suppose the budget is $10,000 per month and Bob wants to add an application. This workflow in FIG. 19 checks the application against the monthly budget 1904. If request is within the budget, it is approved. In the case it is not within the budget, it must be approved through the steps 1906-1912 and 1916-1918 and 1920 describe above for corresponding steps 1806-1812 and 1816-1818 and 1820 in FIG. 18.

Regarding FIG. 20, the steps are identical to steps above for FIG. 18 but in this workflow is a combination of a both a budget based decision and a privileges decision 2004. All the remaining steps would be identical. In this case, the approver is for a VM. In this example the VM has a cost associated with it and must be within a budget. This workflow in FIG. 20 checks the VM against the monthly budget 2022 and in the event it is within budget the privileges are also checked in 2023. If a request is within the budget and privileges allowed, it is approved through steps 2014, 2020, 2022 and 2020. In the case it is not within the budget and or is not with a privilege, it must be approved through the steps 2006-2012 and 2016-2018 and 2020 describe above for corresponding steps 1806-1812 and 1816-1818 and 1820 in FIG. 18.

Non-Limiting Examples

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method for managing computational services in a cloud computing network, the method comprising:
   executing a software component to interact with multiple third-party cloud providers using at least one of
      a platform as a service (PaaS),
      an infrastructure as a service (IaaS),
      a network as a service (NaaS), or
      a combination thereof,
   the interacting occurring via each respective third-party cloud provider's proprietary programming interfaces while exposing only one common access point to an organization via a common interface;
   creating and managing, via custom organization workflows within the multiple third-party cloud providers, a trusted virtual network including encrypted data storage, encrypted data transport, and trusted instances of servers all communicatively coupled together forming a trusted cloud computing environment that is associated with the organization, the creating including storing keys for the encrypted data storage, keys for the encrypted data transport, and session keys associated with a user of the organization in an encrypted database that is separate from an operational computing environment and all within the trusted computing environment where the user is not allowed access to the keys, and whereby the organization manages applications and databases within the trusted virtual network governed by the custom organization workflows which include policies, with an identified group of users in the organization, required to allocate resources in the trusted computing cloud environment;
   executing, on a web server, a web portal to provide a point of access to the third-party cloud computing environment; and
   using access control to the trusted cloud computing environment to ensure access by users authorized by the organization and to ensure compliance with adopted standards.

2. The method of claim 1, wherein the third-party cloud computing environment is at least one of a:
   a public cloud;
   a private cloud;
   a virtual private cloud; and
   a hybrid cloud.

3. The method of claim 1, wherein the adopted standards are at least one of:
   National Institute for Standards and Technology (NIST) Cloud Computing Synopsis and Recommendations known as SP 800-146;
   PCI (Payment Card Industry);
   ITIL (Information Technology Infrastructure Library);
   HIPAA (Health Insurance Portability and Accountability Act);
   FI PS (Federal Information Processing Standards); and
   FISMA (Federal Information Security Management).

4. The method of claim 1, wherein the workflow includes policies to detect DDoS attacks.

5. The method of claim 4, wherein the workflow includes policies to respond to a detected DDoS attack, the policies to respond including actions of: reallocating IP addresses, blocking IP address, blocking geographic regions and limiting bandwidth.

6. The method of claim 1, wherein the workflow includes policies to send reporting information for the applications and information regarding security to a logging server.

7. The method of claim 1, wherein the workflow includes policies required to allocate resources in the trusted computing cloud environment with a maximum cost.

8. The method of claim 1, wherein the workflow includes utilizing at least one policy of the organization to create the workflow to manage at least one of:
   budgeting and governance;
   monitoring management;
   backup management to cover daily, weekly, and monthly backups;
   patch management for security with reminders, staging, testing, and production;
   ticketing management;
   identity management;
   access control management; and
   DDoS management.

9. The method of claim 1, wherein the creating, within at least one third-party cloud computing environment, the trusted virtual network includes using a trusted boot process that when a virtual machine (VM) is brought up in the trusted cloud computing environment to participate in a workload, no data is shared with a new VM until the machine has been verified with an encrypted token exchange.

10. An electronic device, the electronic device comprising:
   a memory;
   a processor communicatively coupled to the memory; and
   a web portal communicatively coupled to the memory and the processor, the web portal to provide a point of access to a cloud computing environment configured to perform:
      executing a software component to interact with multiple third-party cloud providers using at least one of
         a platform as a service (PaaS),
         an infrastructure as a service (IaaS),
         a network as a service (NaaS), or
         a combination thereof,
      the interacting occurring via each respective third-party cloud provider's proprietary programming interfaces while exposing only one common access point to an organization via a common interface;

creating and managing, via custom organization workflows within the multiple third-party cloud providers, a trusted virtual network including encrypted data storage, encrypted data transport, and trusted instances of servers all communicatively coupled together forming a trusted cloud computing environment that is associated with the organization, the creating including storing keys for the encrypted data storage, keys for the encrypted data transport, and session keys associated with a user of the organization in an encrypted database that is separate from an operational computing environment and all within the trusted computing environment where the user is not allowed access to the keys, and whereby the organization manages applications and databases within the trusted virtual network governed by the custom organization workflows which include policies, with an identified group of users in the organization, required to allocate resources in the trusted computing cloud environment;

executing, on a web server, the web portal to provide a point of access to the third-party cloud computing environment; and using access control to the trusted cloud computing environment to ensure access by users authorized by the organization and to ensure compliance with adopted standards.

11. The electronic device of claim 10, wherein the third-party cloud computing environment is at least one of a:
a public cloud;
a private cloud;
a virtual private cloud; and
a hybrid cloud.

12. The electronic device of claim 10, wherein the adopted standards are at least one of:
National Institute for Standards and Technology (NIST) Cloud Computing Synopsis and Recommendations known as SP 800-146;
PCI (Payment Card Industry);
ITIL (Information Technology Infrastructure Library);
HIPAA (Health Insurance Portability and Accountability Act);
Fl PS (Federal Information Processing Standards); and
FISMA (Federal Information Security Management).

13. The electronic device of claim 10, wherein the workflow includes policies to detect DDoS attacks.

14. A computer program product comprising:
a non-transitory storage medium readable by a processing circuit and storing instructions for execution by the processing circuit configured to perform:
executing a software component to interact with multiple third-party cloud providers using at least one of
a platform as a service (PaaS),
an infrastructure as a service (IaaS),
a network as a service (NaaS), or
a combination thereof,
the interacting occurring via each respective third-party cloud provider's proprietary programming interfaces while exposing only one common access point to an organization via a common interface;
creating and managing, via custom organization workflows within the multiple third-party cloud providers, a trusted virtual network including encrypted data storage, encrypted data transport, and trusted instances of servers all communicatively coupled together forming a trusted cloud computing environment that is associated with the organization, the creating including storing keys for the encrypted data storage, keys for the encrypted data transport, and session keys associated with a user of the organization in an encrypted database that is separate from an operational computing environment and all within the trusted computing environment where the user is not allowed access to the keys, and whereby the organization manages applications and databases within the trusted virtual network governed by the custom organization workflows which include policies, with an identified group of users in the organization, required to allocate resources in the trusted computing cloud environment;
executing, on a web server, a web portal to provide a point of access to the third-party cloud computing environment; and
using access control to the trusted cloud computing environment to ensure access by users authorized by the organization and to ensure compliance with adopted standards.

15. The computer program product of claim 14, wherein the workflow includes policies to send reporting information for the applications and information regarding security to a logging server.

16. The computer program product of claim 14, wherein the workflow includes policies required to allocate resources in the trusted computing cloud environment with a maximum cost.

* * * * *

UNITED STATES PATENT AND TRADEMARK OFFICE
CERTIFICATE OF CORRECTION

| | | |
|---|---|---|
| PATENT NO. | : 8,910,278 B2 | Page 1 of 1 |
| APPLICATION NO. | : 13/110595 | |
| DATED | : December 9, 2014 | |
| INVENTOR(S) | : Joel Davne et al. | |

It is certified that error appears in the above-identified patent and that said Letters Patent is hereby corrected as shown below:

IN THE CLAIMS:

Column 16, line 16, "F1 PS" should read --FIPS--

Column 16, line 61, "1aaS" should read --Iaas--

Column 17, line 45, "F1 PS" should read --FIPS--

Signed and Sealed this
Eleventh Day of August, 2015

Michelle K. Lee
*Director of the United States Patent and Trademark Office*